US011976497B2

(12) United States Patent
Bullwinkel et al.

(10) Patent No.: US 11,976,497 B2
(45) Date of Patent: May 7, 2024

(54) DRAWER LOCK ASSEMBLIES

(71) Applicant: Delta Lock Company, LLC, Bohemia, NY (US)

(72) Inventors: William H. Bullwinkel, Farmingdale, NY (US); Robert Ludwig, Newton, NJ (US); David R. Wachsman, Palm Beach Gardens, NY (US); Alvin Ma, Irvine, CA (US)

(73) Assignee: Innovation Lock, LLC, Palm Beach Gardens, FL (US)

( * ) Notice: Subject to any disclaimer, the term of this patent is extended or adjusted under 35 U.S.C. 154(b) by 230 days.

(21) Appl. No.: 17/558,768

(22) Filed: Dec. 22, 2021

(65) Prior Publication Data

US 2022/0213719 A1 Jul. 7, 2022

Related U.S. Application Data

(60) Provisional application No. 63/172,831, filed on Apr. 9, 2021, provisional application No. 63/134,000, filed on Jan. 5, 2021.

(51) Int. Cl.

| | |
|---|---|
| ***E05B 65/46*** | (2017.01) |
| ***E05B 9/08*** | (2006.01) |
| ***E05B 29/00*** | (2006.01) |

(52) U.S. Cl.

CPC ................ *E05B 65/46* (2013.01); *E05B 9/08* (2013.01); *E05B 29/00* (2013.01); *E05B 29/0026* (2013.01)

(58) Field of Classification Search

CPC ..................... E05B 65/00; E05B 65/46; E05B 65/461–466; E05B 9/00; E05B 9/08;

(Continued)

(56) References Cited

U.S. PATENT DOCUMENTS

| | | | |
|---|---|---|---|
| 100,738 | A | 3/1870 | Dwight |
| 884,260 | A | 4/1908 | Boyd |

(Continued)

FOREIGN PATENT DOCUMENTS

| | | | |
|---|---|---|---|
| DE | 3233976 | C1 | 8/1983 |
| WO | 8300353 | A1 | 2/1983 |

OTHER PUBLICATIONS

Olympus Ratchet Lock, posted Dec. 13, 2008 [online], [retrieved Feb. 27, 2023]. Retrieved from internet, https://www.arnazon.com/Olympus-Sliding-Ratchet-Keyed-Different/dp/B005WL056Q (Year: 2008).

(Continued)

*Primary Examiner* — Nathan Cumar

(74) *Attorney, Agent, or Firm* — Michael J Porco; Gerald E Hespos

(57) ABSTRACT

A drawer lock assembly is provided including a housing having a front face and a rear face; a barrel having a first end extending perpendicularly from the front face of the housing and a second end extending through the rear face of the housing; a locking actuation member disposed through the first end of the barrel; a driver disposed through the second end of the barrel to engage the locking actuation member; a bolt including a first member offset from a second member in a parallel relationship, the first member includes a slot configured to receive a cam of the driver; and an endplate configured to retain the driver and bolt in the housing, the endplate including a channel configured to receive the second member of the bolt, wherein upon actuation of the locking actuation member, the second member extends beyond the housing to engage a recess of a structure.

19 Claims, 32 Drawing Sheets

Cross Section

(58) Field of Classification Search
CPC .......... E05B 9/082; E05B 9/084; E05B 9/088; E05B 29/00; E05B 29/0006; E05B 29/0013; E05B 29/002; E05B 29/0026
USPC ............................................................ 70/217
See application file for complete search history.

(56) References Cited

U.S. PATENT DOCUMENTS

| | | | | |
|---|---|---|---|---|
| 1,342,728 | A | 6/1920 | Welch | |
| 1,539,301 | A | 5/1925 | Cooper | |
| 1,864,883 | A | 6/1932 | Edward | |
| 1,938,112 | A | 12/1933 | Schlage | |
| 1,965,336 | A | 7/1934 | Fitz | |
| 2,032,821 | A | 3/1936 | Carral | |
| 2,140,066 | A | 12/1938 | White | |
| 2,275,362 | A | 3/1942 | Golden et al. | |
| 2,720,102 | A | 10/1955 | Spain | |
| 2,938,373 | A | 5/1960 | Gray et al. | |
| 3,262,292 | A | 7/1966 | Glass | |
| 3,340,709 | A | 9/1967 | Callahan | |
| 3,345,838 | A | 10/1967 | Russell et al. | |
| 3,423,968 | A | 1/1969 | Foote | |
| 3,503,233 | A | 3/1970 | Russell et al. | |
| 3,563,593 | A | 2/1971 | Leier et al. | |
| 3,589,152 | A | 6/1971 | Glass et al. | |
| 3,696,647 | A | 10/1972 | Balicki | |
| 3,726,115 | A | 4/1973 | Wellekens | |
| 3,863,475 | A | 2/1975 | Foss | |
| 3,933,015 | A | 1/1976 | Balicki | |
| 4,003,227 | A | 1/1977 | Casey | |
| 4,009,599 | A | 3/1977 | Patriquin | |
| 4,067,599 | A | 1/1978 | Ohno | |
| 4,356,580 | A | 11/1982 | Kurtz | |
| 4,418,554 | A | 12/1983 | Wolfgang | |
| 4,476,699 | A | 10/1984 | Dahlborg | |
| 4,565,080 | A | 1/1986 | Kincaid et al. | |
| 4,617,810 | A | 10/1986 | Fish et al. | |
| 4,630,457 | A | 12/1986 | Kincaid et al. | |
| 4,672,827 | A | 6/1987 | Craig | |
| 4,708,006 | A | 11/1987 | Hodgson | |
| 4,756,638 | A | 7/1988 | Neyret | |
| 4,768,360 | A | 9/1988 | Foshee | |
| 4,793,163 | A | 12/1988 | MacFarlane et al. | |
| 4,809,525 | A | 3/1989 | Cox | |
| 4,899,563 | A * | 2/1990 | Martin .................... | E05B 9/084 70/451 |
| 4,920,774 | A | 5/1990 | Martin | |
| 5,010,753 | A | 4/1991 | Boris | |
| 5,038,589 | A | 8/1991 | Martin | |
| 5,101,649 | A | 4/1992 | Duval | |
| 5,121,619 | A | 6/1992 | Martin | |
| 5,127,244 | A | 7/1992 | Myers | |
| D337,041 | S | 7/1993 | Carl | |
| 5,251,467 | A | 10/1993 | Anderson | |
| 5,255,544 | A | 10/1993 | Wu | |
| 5,315,850 | A | 5/1994 | Edeus et al. | |
| 5,345,794 | A | 9/1994 | Jenks | |
| 5,492,206 | A | 2/1996 | Shieh | |
| 5,499,518 | A | 3/1996 | Shieh | |
| 5,548,981 | A | 8/1996 | Kirk | |
| 5,590,555 | A | 1/1997 | Kester et al. | |
| 5,615,566 | A | 4/1997 | Brandt | |
| 5,657,652 | A | 8/1997 | Martin | |
| 5,678,438 | A | 10/1997 | Kolkman et al. | |
| 5,722,275 | A | 3/1998 | Price et al. | |
| 5,737,950 | A | 4/1998 | Yun-Bin | |
| 5,813,260 | A | 9/1998 | Widen | |
| 5,819,889 | A | 10/1998 | Shieh | |
| 5,873,272 | A | 2/1999 | Thompson | |
| D408,711 | S | 4/1999 | Bianco | |
| 5,913,907 | A | 6/1999 | Lee | |
| 5,970,760 | A | 10/1999 | Shen | |
| 6,035,673 | A | 3/2000 | Harrison | |
| 6,079,241 | A | 6/2000 | Burleigh et al. | |
| 6,092,402 | A | 7/2000 | Porcelli et al. | |
| 6,161,404 | A | 12/2000 | Westwinkel | |
| 6,393,882 | B1 | 5/2002 | Higgins | |
| 6,523,379 | B2 | 2/2003 | Teskey | |
| 6,606,890 | B1 | 8/2003 | Widen | |
| 6,708,539 | B1 | 3/2004 | Widen | |
| 6,920,770 | B2 | 7/2005 | Lurie et al. | |
| D525,110 | S | 7/2006 | Beard et al. | |
| RE39,364 | E | 10/2006 | Brandt | |
| 7,178,372 | B1 | 2/2007 | Shen | |
| 7,308,809 | B2 | 12/2007 | Lu | |
| 7,340,928 | B2 | 3/2008 | Hoffman | |
| RE41,188 | E | 4/2010 | Lurie et al. | |
| 7,695,031 | B2 | 4/2010 | Jackson, Jr. et al. | |
| 7,716,958 | B2 | 5/2010 | Martin | |
| 7,836,735 | B2 | 11/2010 | Liu | |
| 7,849,720 | B2 | 12/2010 | Reese | |
| 7,874,189 | B2 | 1/2011 | Martin | |
| 7,895,867 | B2 | 3/2011 | Hsieh | |
| 7,918,111 | B2 | 4/2011 | Uliano | |
| 8,028,555 | B2 * | 10/2011 | Lurie ...................... | E05C 3/042 70/DIG. 62 |
| D651,889 | S | 1/2012 | Mahaffey et al. | |
| D667,286 | S | 9/2012 | Wu | |
| D670,993 | S | 11/2012 | Lin | |
| 8,444,100 | B2 | 5/2013 | Takahashi et al. | |
| 8,646,297 | B2 | 2/2014 | Foti | |
| 8,776,557 | B2 | 7/2014 | Wang | |
| 8,842,422 | B2 | 9/2014 | Hung et al. | |
| 8,905,693 | B2 | 12/2014 | Coffland et al. | |
| 8,919,156 | B1 | 12/2014 | Liu | |
| 8,978,426 | B2 | 3/2015 | Wang | |
| D733,520 | S | 7/2015 | Barna | |
| 9,167,918 | B2 | 10/2015 | Leyden | |
| 9,234,369 | B2 | 1/2016 | Gupta et al. | |
| 9,267,310 | B2 | 2/2016 | Linnåsen et al. | |
| 9,435,144 | B2 * | 9/2016 | Bullwinkel ............. | E05B 67/36 |
| 9,524,626 | B2 | 12/2016 | Brühwiler et al. | |
| 9,593,509 | B2 | 3/2017 | Murray | |
| D789,770 | S | 6/2017 | Reeb et al. | |
| 9,816,289 | B2 | 11/2017 | Bullwinkel | |
| D804,283 | S | 12/2017 | Jasper | |
| 10,087,653 | B2 | 10/2018 | Bullwinkel | |
| 10,156,088 | B2 | 12/2018 | Bullwinkel et al. | |
| 10,184,270 | B2 | 1/2019 | Bullwinkel | |
| D840,212 | S | 2/2019 | Huang et al. | |
| 10,208,510 | B1 | 2/2019 | Dyck | |
| 10,435,914 | B2 | 10/2019 | Ma | |
| 10,662,672 | B2 | 5/2020 | Bullwinkel | |
| 10,724,276 | B2 | 7/2020 | Ma et al. | |
| D899,218 | S | 10/2020 | Bullwinkel et al. | |
| 11,603,680 | B2 | 3/2023 | Ma et al. | |
| D988,835 | S | 6/2023 | Bullwinkel et al. | |
| 2001/0045114 | A1 | 11/2001 | Sokurenko | |
| 2003/0019258 | A1 | 1/2003 | Irgens et al. | |
| 2005/0011237 | A1 | 1/2005 | Lurie et al. | |
| 2005/0011239 | A1 | 1/2005 | Lurie et al. | |
| 2005/0241348 | A1 | 11/2005 | Devecki | |
| 2005/0271494 | A1 | 12/2005 | Hidalgo et al. | |
| 2005/0279894 | A1 | 12/2005 | Sedon et al. | |
| 2006/0086162 | A1 | 4/2006 | Huang | |
| 2006/0157431 | A1 | 7/2006 | Nagelski et al. | |
| 2007/0175246 | A1 | 8/2007 | Hsai | |
| 2007/0227209 | A1 * | 10/2007 | Massard ................... | E05B 9/04 70/371 |
| 2009/0071209 | A1 * | 3/2009 | Lurie ...................... | E05B 17/04 70/391 |
| 2010/0031717 | A1 | 2/2010 | Lurie et al. | |
| 2010/0148524 | A1 * | 6/2010 | Czerwinski, Jr. ....... | E05B 15/02 292/299 |
| 2010/0170309 | A1 * | 7/2010 | Liu ........................ | E05B 65/46 70/86 |
| 2010/0212371 | A1 | 8/2010 | Foti | |
| 2011/0127795 | A1 | 6/2011 | Still et al. | |
| 2011/0132047 | A1 | 6/2011 | Terhaar et al. | |
| 2011/0316325 | A1 | 12/2011 | Martin, III et al. | |
| 2013/0105419 | A1 | 5/2013 | Kologe | |
| 2014/0013813 | A1 | 1/2014 | Le | |
| 2014/0037399 | A1 | 2/2014 | Hyatt | |
| 2014/0298869 | A1 | 10/2014 | Wang | |

(56) References Cited

U.S. PATENT DOCUMENTS

| | | | |
|---|---|---|---|
| 2015/0176307 | A1 | 6/2015 | Bullwinkel |
| 2016/0281393 | A1 | 9/2016 | Bullwinkel et al. |
| 2017/0298651 | A1 | 10/2017 | Ma |
| 2017/0350163 | A1 | 12/2017 | Ma et al. |
| 2018/0038132 | A1 | 2/2018 | Bullwinkel |
| 2019/0145126 | A1 | 5/2019 | Wolfish et al. |
| 2021/0246935 | A1 | 8/2021 | Grewell et al. |
| 2022/0213719 | A1 | 7/2022 | Bullwinkel et al. |
| 2022/0356734 | A1 | 11/2022 | Bullwinkel et al. |

OTHER PUBLICATIONS

Desk Lock + Door Puncher, posted May 6, 2019 [online], [retrieved Nov. 14, 2022]. Retrieved from internet, https://www.amazon.com/dp/B07RDJSS6W (Year: 2019).

Double Door Lock, posted Apr. 18, 2022 [online], [retrieved Nov. 14, 2022]. Retrieved from internet, https://www.amazon.com/Cabinet-Deadbolt-Door-Installation-Drilling-Diameter/dpIB09Y51 MHVK (Year: 2022).

U.S. Appl. No. 29/673,492, Dec. 14, 2018, William H. Bullwinkel.

U.S. Appl. No. 29/782,823, May 10, 2021, William H. Bullwinkel.

Compx Timberline, Locks & File Frame for wood furniture & cabinets, Catalog #0816, Copyright 2016, pp. 1-36.

Gear Lock DL37, Data Sheet, Kenstan Lock Company, Feb. 2020, one (1) page.

Rollok Rolling Doors & Security Shutters, Product Catalog, access at https://cdn.thomasnet.com/ccp/30841252/258644.pdf; Nov. 11, 2017; pp. 1-16.

* cited by examiner

Perspective View

Front View

Rear View

Top View

Bottom View

Left View

Right View

Rear Perspective View

Cross Section

DRAWER LOCK ASSEMBLIES

PRIORITY

This application claims priority to U.S. Provisional Patent Application Ser. No. 63/134,000, filed Jan. 5, 2021, and to U.S. Provisional Patent Application Ser. No. 63/172,831, filed Apr. 9, 2021, the contents of which are hereby incorporated by reference in their entireties.

TECHNICAL FIELD

The present disclosure relates generally to lock mechanisms, and more particularly, to drawer lock assemblies for use with cabinet drawers, desk drawers and the like.

BACKGROUND

Numerous types of core cylinders for locks are known and popularly used for various applications. In one application, a lock is provided to secure a drawer of a cabinet, desk or similar structure. In such application, a lock assembly is mounted through a hole or aperture of a drawer, and thus moves with the drawer when opened or closed. When the drawer is in a closed position, a bolt or latch projects from the lock assembly into an aperture, recess or other portion of the structure to secure the drawer in the closed position. To open the drawer, an appropriate key is inserted into the core cylinder and rotated to withdraw the bolt or latch into the lock assembly and from the portion of the structure, enabling the drawer to be opened.

SUMMARY

Drawer lock assemblies for use with cabinet drawers, desk drawers and the like are provided.

According to one aspect of the present disclosure, a locking device includes a housing, a driver, a bolt, and an end plate. The housing includes a front face and a rear face. The front face includes a cylindrical member or barrel that extends perpendicular to a front face of the housing. The barrel includes an aperture configured to receive a locking actuation member such as a core, e.g., a key removable core (KRC), small format interchangeable core (SFIC), etc. When an appropriate key inserted into a keyhole of the locking actuation member, rotation of the key will actuate the driver that subsequently actuates the bolt into a locked or unlocked position. The bolt includes a first member which is offset from a second member in a parallel relationship, wherein the second member rides in a channel of the end plate. It is to be appreciated that the locking device may be mounted on an inner surface of a drawer, where the drawer may include an aperture to receive the barrel including the locking actuation member so the keyhole of the locking actuation member is exposed on an outer surface of the drawer.

According to one aspect of the present disclosure, a drawer lock assembly includes a housing having a front face and a rear face separated by a predetermined width; a barrel having a first end extending perpendicularly from the front face of the housing and a second end extending through the rear face of the housing; a locking actuation member disposed through the first end of the barrel; a driver disposed through the second end of the barrel to engage the locking actuation member; a bolt including a first member offset from a second member in a parallel relationship, the first member includes a slot configured to receive a cam of the driver; and an endplate configured to retain the driver and bolt in the housing, the endplate including a channel configured to receive the second member of the bolt, wherein upon actuation of the locking actuation member by a key, the second member extends beyond the housing to engage a recess of a structure.

In one aspect, the driver includes a first surface and a second surface, the first surface including a slot that is configured to receive a member of locking actuation member, the second surface including cam configured to interact with the bolt to move the bolt into a locked or unlocked position.

In another aspect, the locking actuation member is a key removable core.

In a further aspect, the rear surface of the housing includes a recess configured to enable actuation of the first member of the bolt.

In another aspect, the housing includes at least two mounting holes extending from an inner surface of the housing and positioned on opposite sides of the barrel, a leg couples each mounting hole barrel to give structural support to the at least two mounting holes.

In still another aspect, at least two mounting holes are recessed from a rear surface of the housing.

In one aspect, the driver includes a circular disc having a first surface and a second surface, the first surface including a first prong and a second prong extending perpendicularly from the first surface and configured to engage the locking actuation member, the second surface including a cam configured to interact with the bolt to move bolt into a locked or unlocked position.

In yet another aspect, the locking actuation member is a small format interchangeable core, the small format interchangeable core having a first end and a second end, the second end including first and second channels configured to receive the first and second prongs of the driver.

In one aspect, the drawer lock assembly further includes a retention plate that retains the driver in the recess of the housing.

In another aspect, the retention plate includes an aperture that receives the cam of the driver and limits the motion of the cam.

In a further aspect, the drawer lock assembly further includes a retention plate that retains the driver in the recess of the housing, wherein the retention plate includes a semi-circular aperture that receives the cam of the driver and limits the motion of the cam.

In one aspect, the barrel is a cylindrical barrel.

In another aspect, the barrel is an oval barrel.

In a further aspect, the barrel is a faceted barrel.

In yet another aspect, the barrel is a rectangular barrel.

In one aspect, the housing is at least one of a rectangular housing and a faceted housing.

In still another aspect, the locking actuation member is at least one of a small format interchangeable core, a key removable, a large format interchangeable core, a full size interchangeable core and/or a fixed cylinder.

BRIEF DESCRIPTION OF THE DRAWINGS

The above and other aspects, features, and advantages of the present disclosure will become more apparent in light of the following detailed description when taken in conjunction with the accompanying drawings in which:

FIG. 17A is a front perspective view, FIG. 17B is a side view, FIG. 17C is a rear perspective view and FIG. 17D is a rear view;

FIG. 18A is a front perspective view, FIG. 18B is a side view and FIG. 18C is a rear perspective view;

It should be understood that the drawings are for purposes of illustrating the concepts of the disclosure and are not necessarily the only possible configuration for illustrating the disclosure.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail.

Referring to FIGS. 1-8, various views of a locking device 10 in accordance with an embodiment of the present disclosure are provided.

Figure 1:
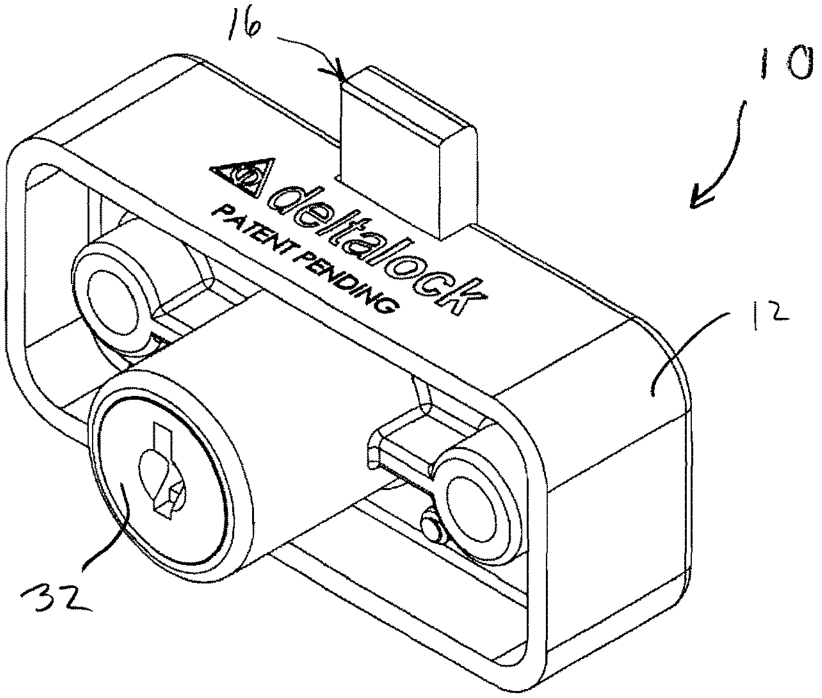
FIG. 1 is a front, perspective view of a locking device in accordance with an embodiment of the present disclosure.
Figure 2:
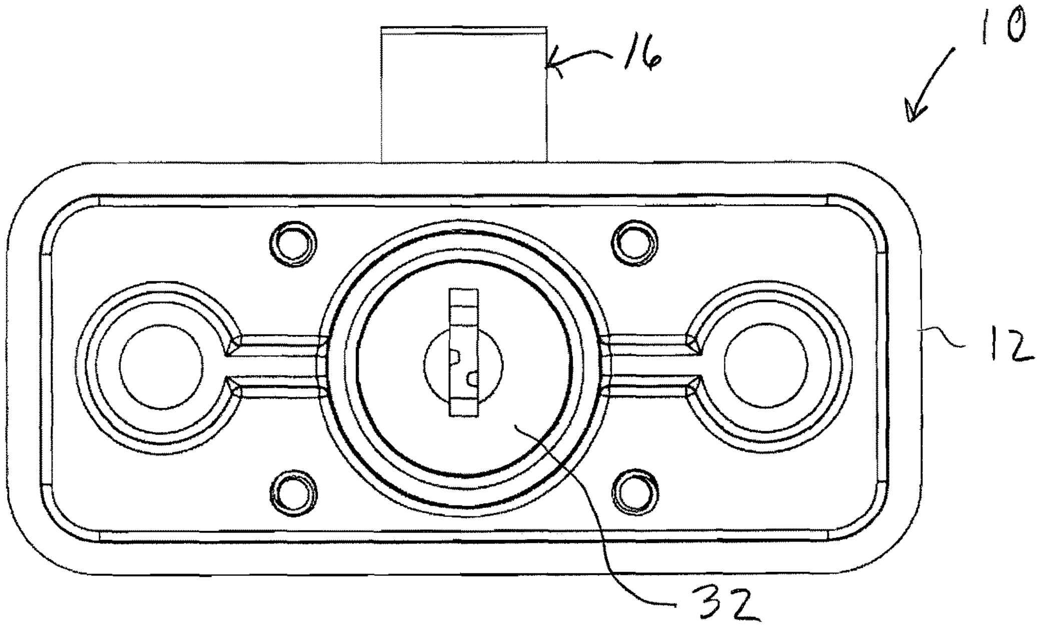
FIG. 2 is a front view of the locking device shown in FIG. 1 in accordance with an embodiment of the present disclosure.
Figure 3:
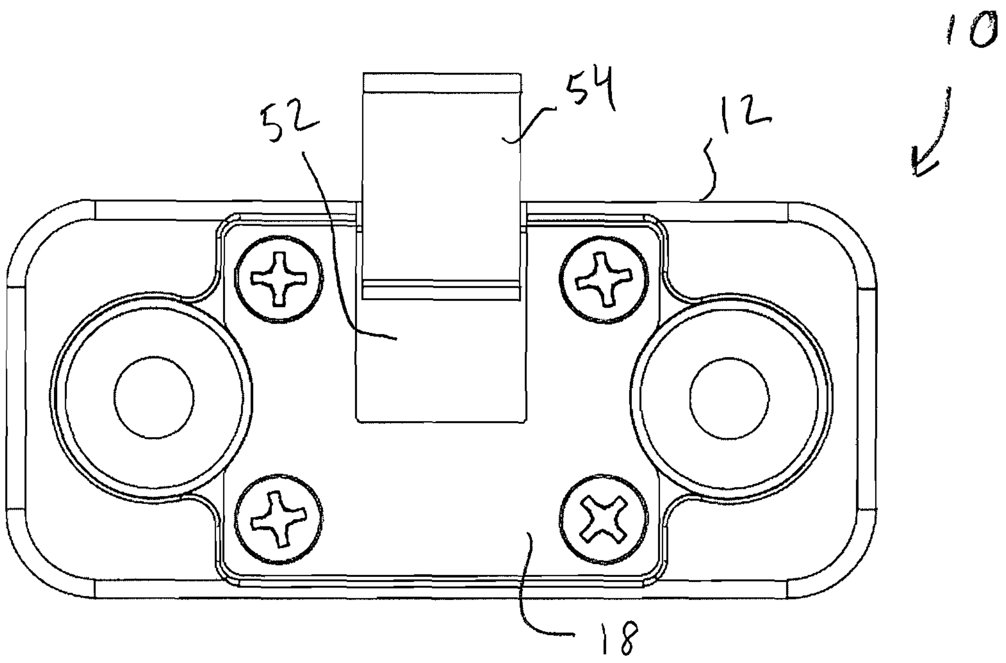
FIG. 3 is a rear view of the locking device shown in FIG. 1 in accordance with an embodiment of the present disclosure.
Figure 4:
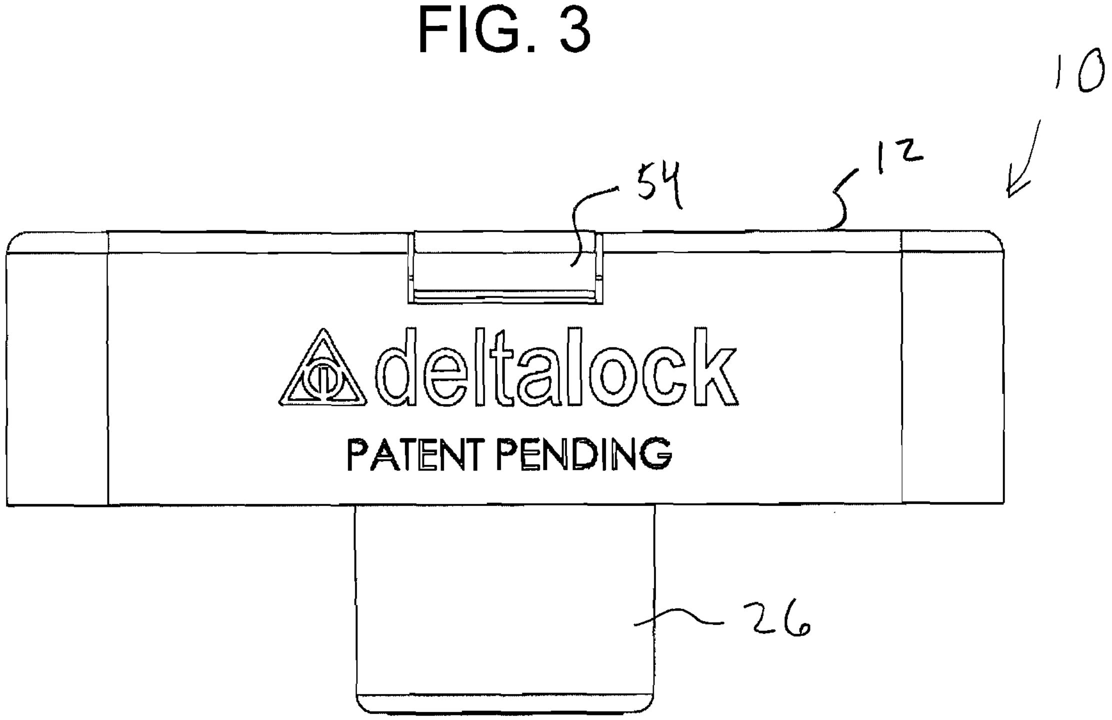
FIG. 4 is a top view of the locking device shown in FIG. 1 in accordance with an embodiment of the present disclosure.
Figure 5:
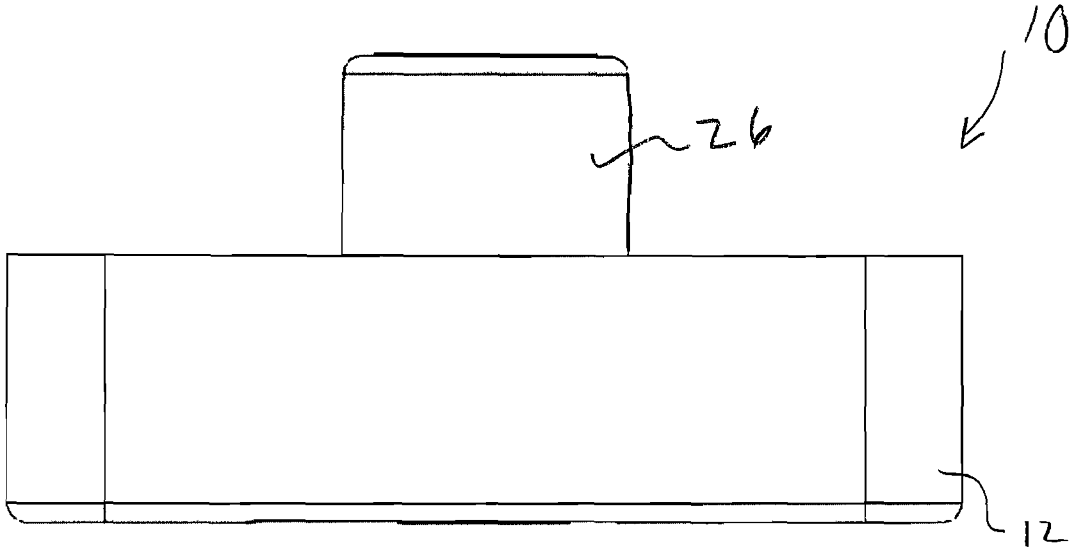
FIG. 5 is a bottom view of the locking device shown in FIG. 1 in accordance with an embodiment of the present disclosure.
Figure 6:
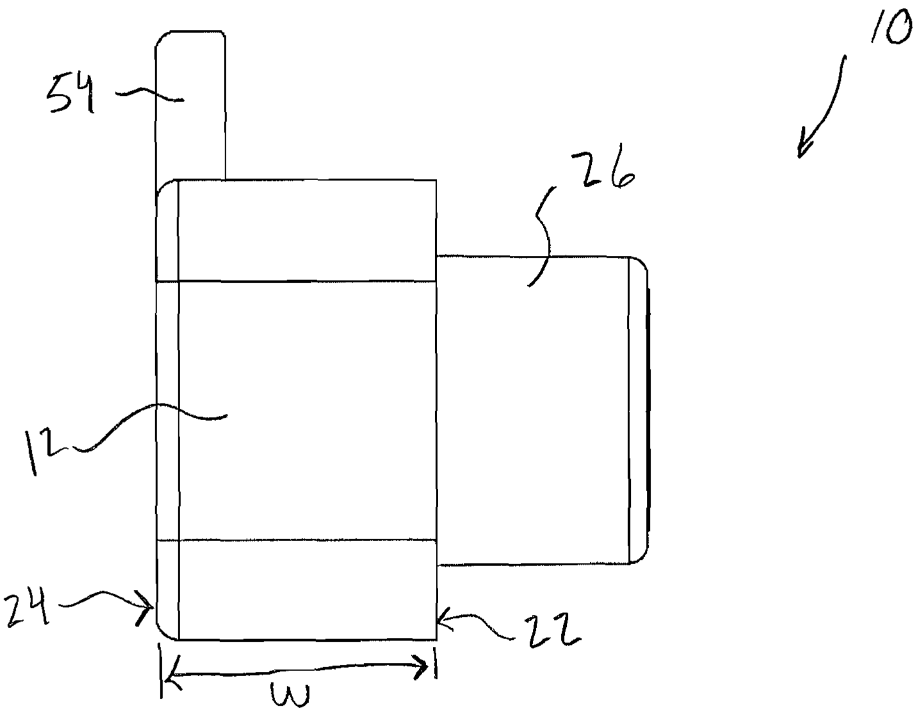
FIG. 6 is a left side view of the locking device shown in FIG. 1 in accordance with an embodiment of the present disclosure.
Figure 7:
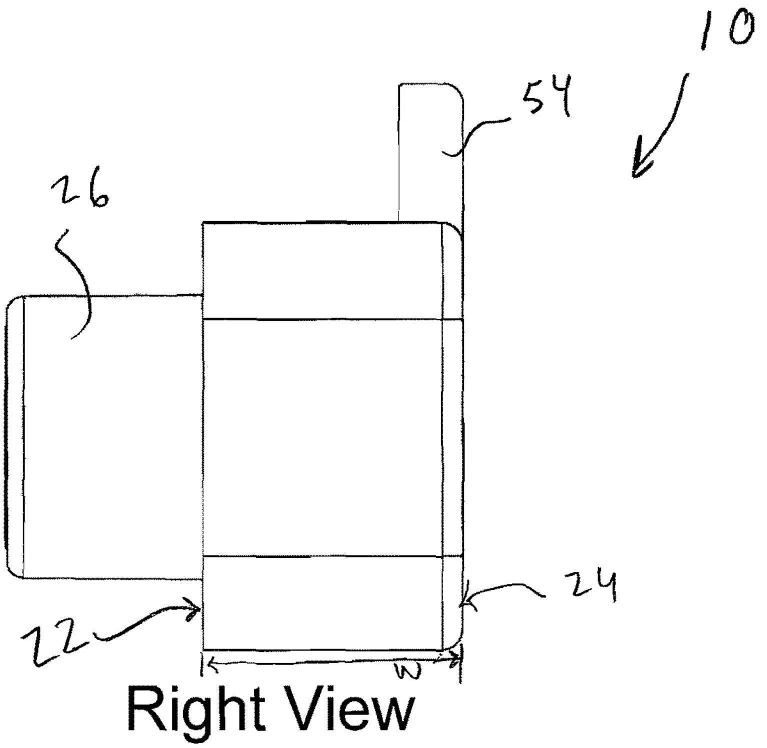
FIG. 7 is a right side view of the locking device shown in FIG. 1 in accordance with an embodiment of the present disclosure.
Figure 8:
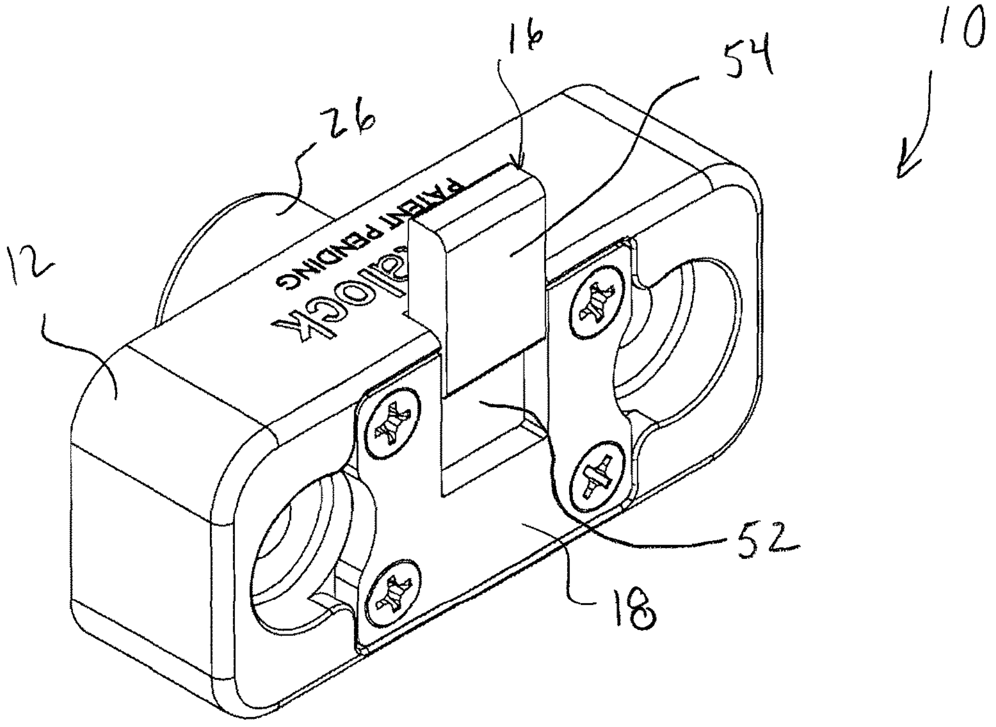
FIG. 8 is a rear, perspective view of the locking device shown in FIG. 1 in accordance with an embodiment of the present disclosure.
Figure 9:
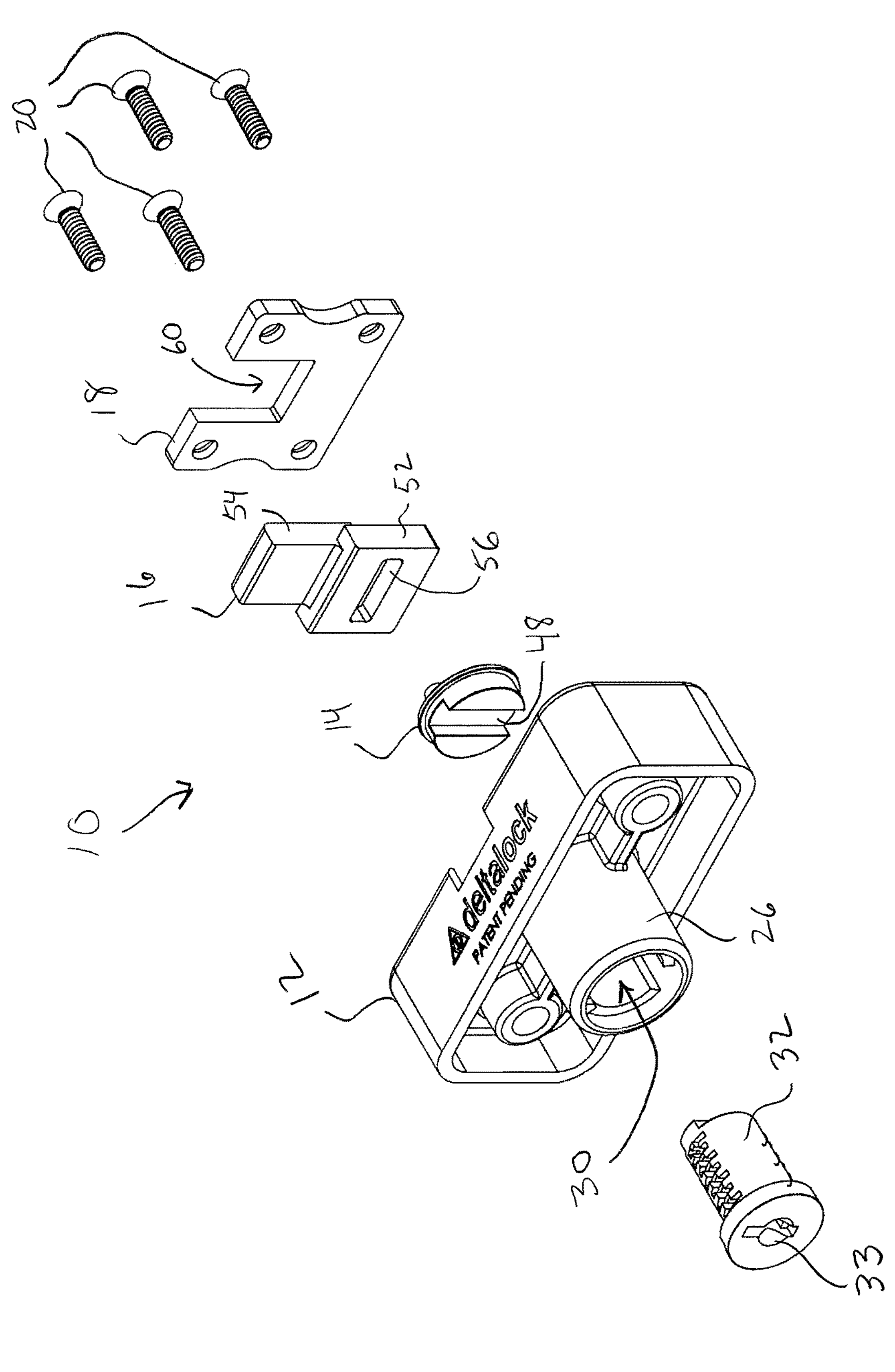
FIG. 9 is a front, perspective exploded view of a locking device in accordance with an embodiment of the present disclosure.
Figure 10:
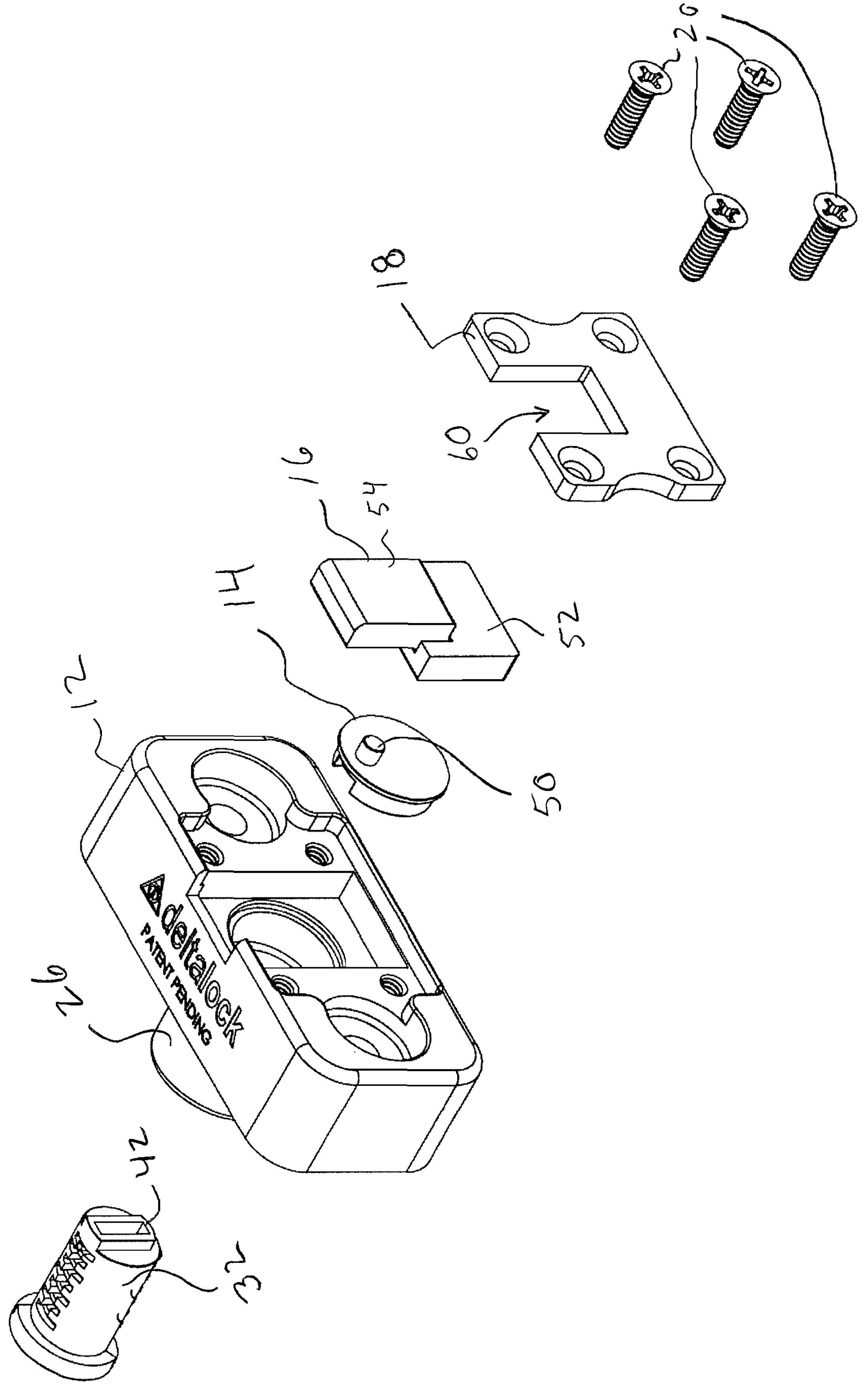
FIG. 10 is a rear, perspective exploded view of a locking device in accordance with an embodiment of the present disclosure.
Figure 11:
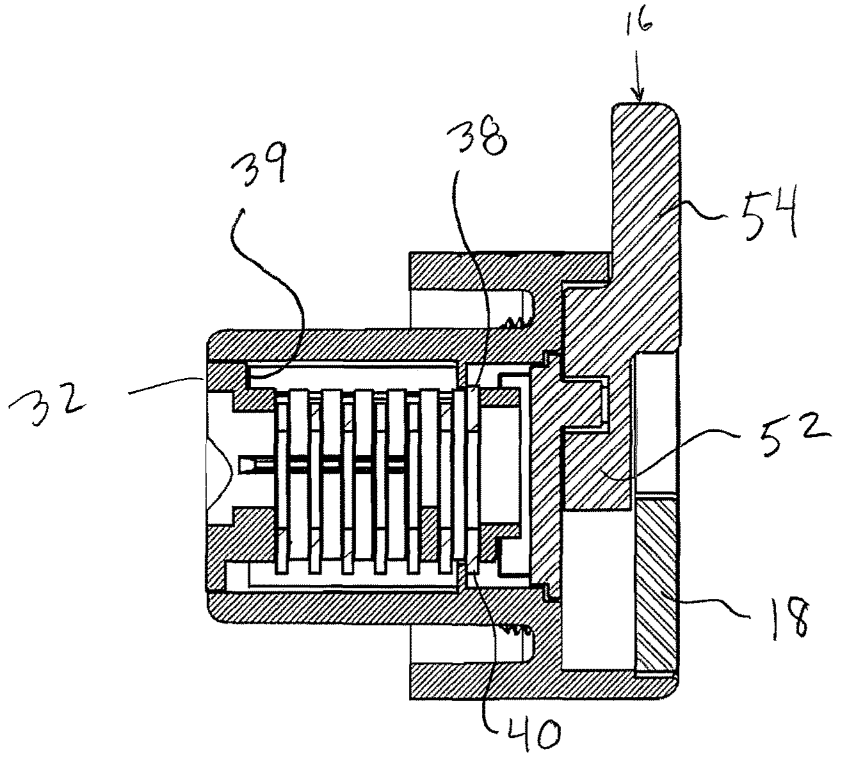
FIG. 11 is a cross sectional view of the locking device as shown in FIG. 7.
Figure 12:
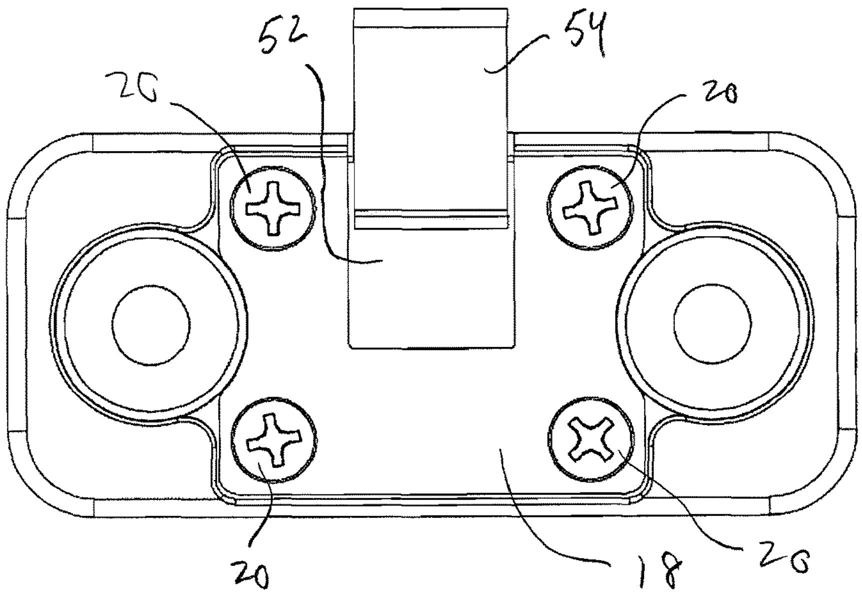
FIG. 12 is a rear view of a locking device in a locked position in accordance with an embodiment of the present disclosure.
Figure 13:
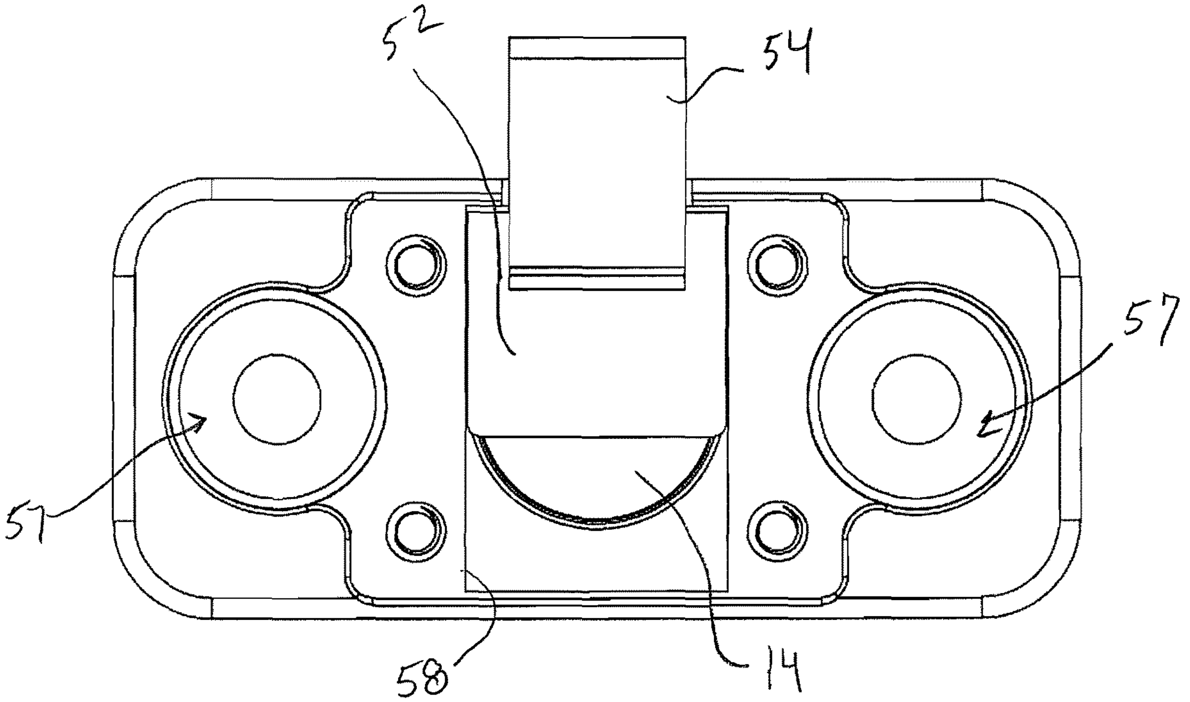
FIG. 13 is a rear view of a locking device shown in FIG. 12 with an end plate removed in accordance with an embodiment of the present disclosure.
Figure 14:
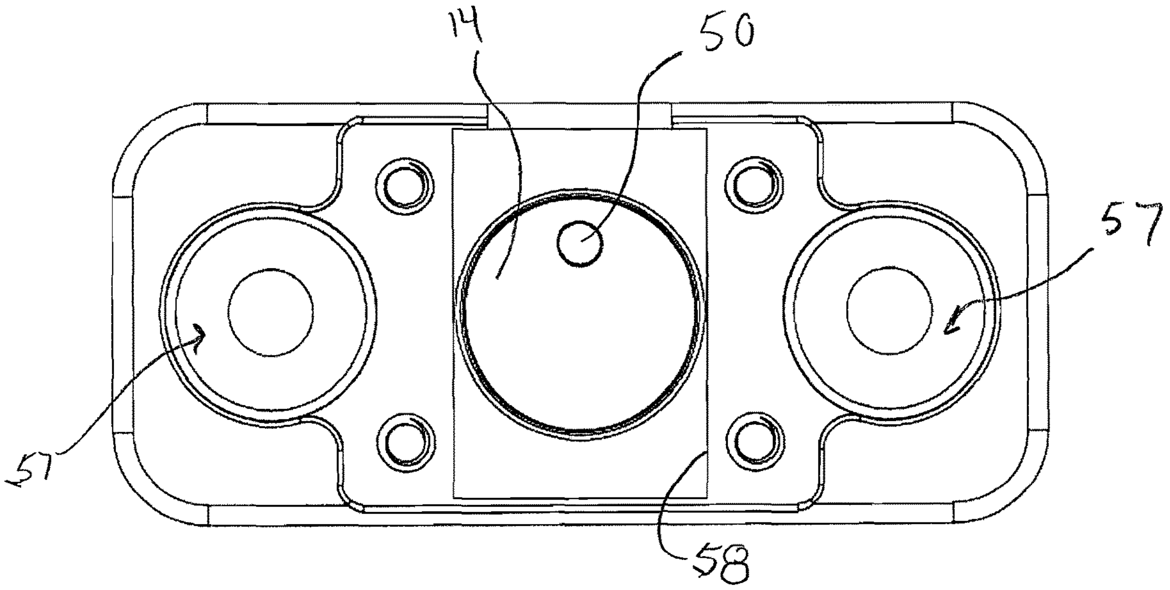
FIG. 14 is a rear view of a locking device shown in FIG. 12 with an end plate and bolt removed in accordance with an embodiment of the present disclosure.
Figure 15A:
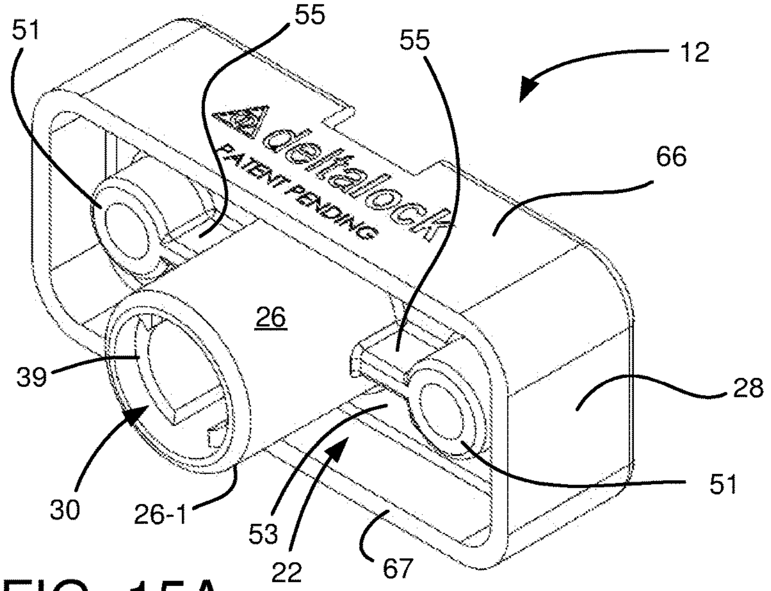
FIG. 15A is a front, perspective view of a housing of a locking device in accordance with an embodiment of the present disclosure.
Figure 15B:
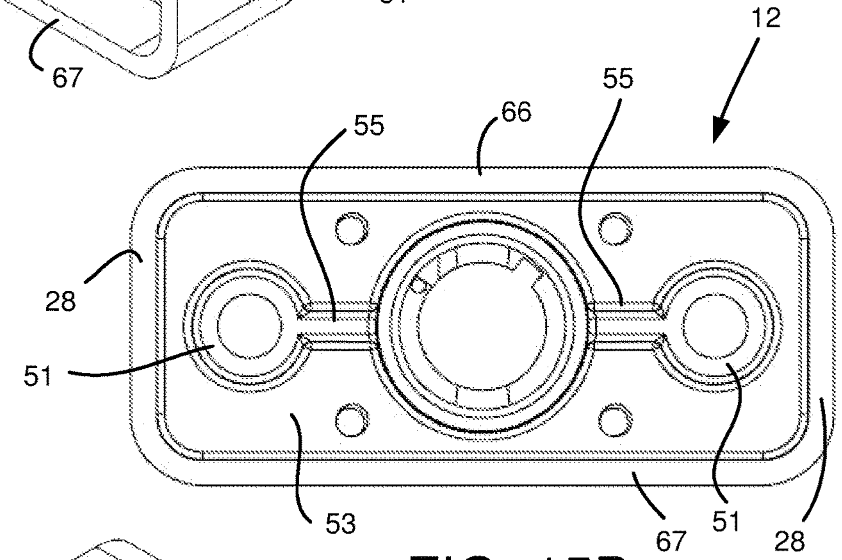
FIG. 15B is a front view of a housing of a locking device in accordance with an embodiment of the present disclosure.
Figure 15C:
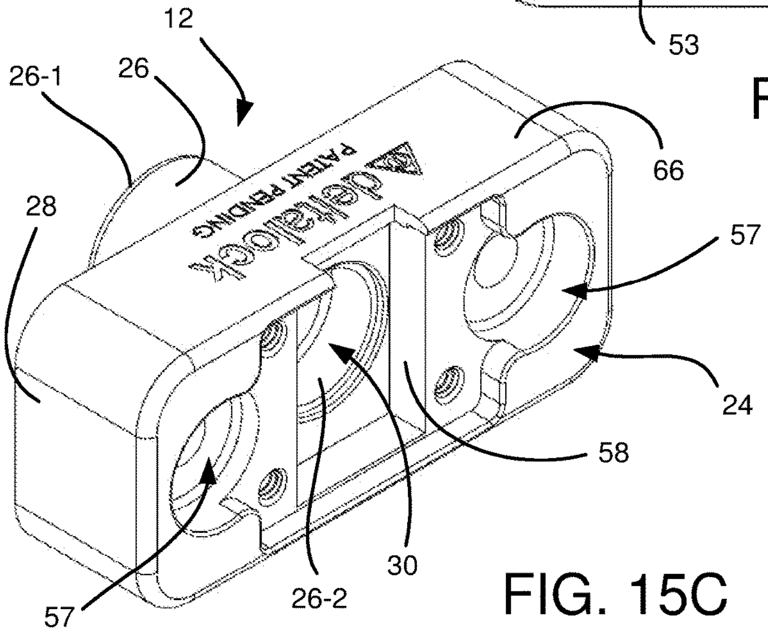
FIG. 15C is a rear, perspective view of a housing of a locking device in accordance with an embodiment of the present disclosure.
Figure 16A:
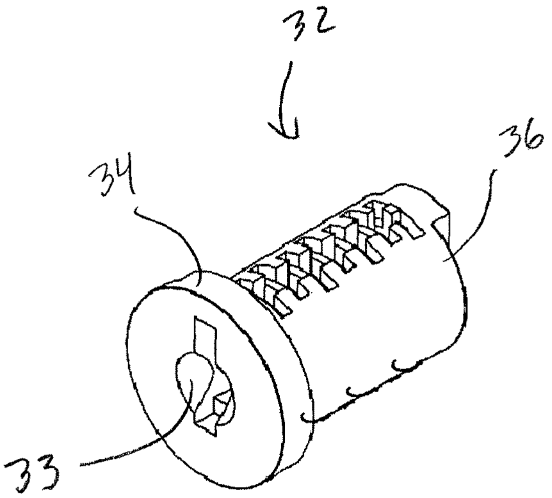
FIG. 16A is a front, perspective view of a core of a locking device in accordance with an embodiment of the present disclosure.
Figure 16B:
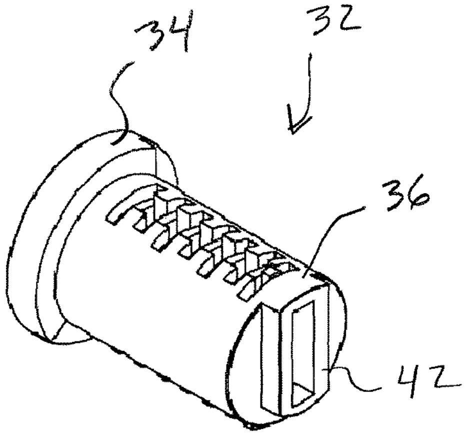
FIG. 16B is a rear, perspective view of a core of a locking device in accordance with an embodiment of the present disclosure.
Figure 17A:
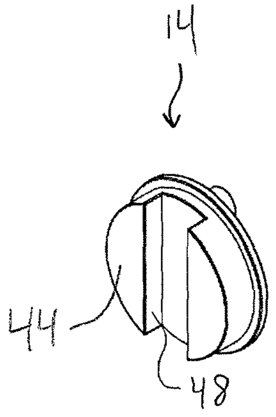
FIGS. 17A-17D illustrate various views of a driver of a locking device in accordance with an embodiment of the present disclosure, where
Figure 17B:
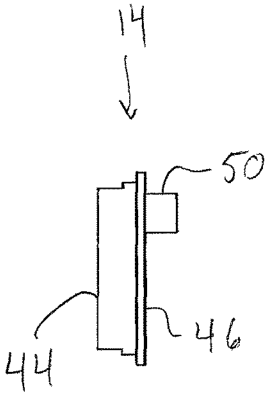
Figure 17C:
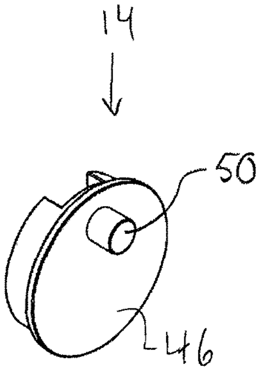
Figure 17D:
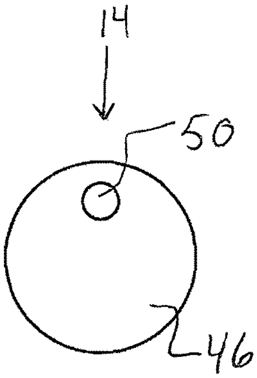

Referring to FIGS. 9 and 10, exploded views of the locking device 10 are provided. The locking device 10 includes a housing 12, a driver 14, bolt 16, an end plate 18 and screws 20. In this embodiment, housing 12 is generally rectangular and includes a front face 22 and a rear face 24 face separated by a predetermined width w. The housing further includes a top wall 66, bottom wall 67 and side walls 28. The front face 22 includes a cylindrical member or barrel 26 that extends perpendicular to an outer wall 28 of the housing 12. The barrel 26 having a first end 26-1 extending perpendicularly from the front face 22 of the housing 12 and a second end 26-2 extending to the rear face 24 of the housing 12, as shown in FIGS. 15A and 15C. The cylindrical member or barrel 26 includes an aperture 30 configured to receive a locking actuation member such as a core 32. As shown in FIGS. 16A and 16B, core 32, e.g., a key removable core (KRC), is generally cylindrical and includes a first end 34 and a second 36. When the core 32 is disposed in the aperture 30, the first end 34 will come into contact with an edge 39 formed in the aperture 30 to prevent further movement of the core 32 into the aperture 30. Core 32 further includes a first projection 38 and a second projection 40 which retain the core 32 in the housing 12, as best shown in FIG. 11. It is to be appreciated that an appropriate key inserted into a keyhole 33 of core 32 will actuate the first and second projections 38, 40. The second end 36 of core 32 includes a rectangular member 42 that is configured to interact with driver 14, as will be described below.

Figure 18A:
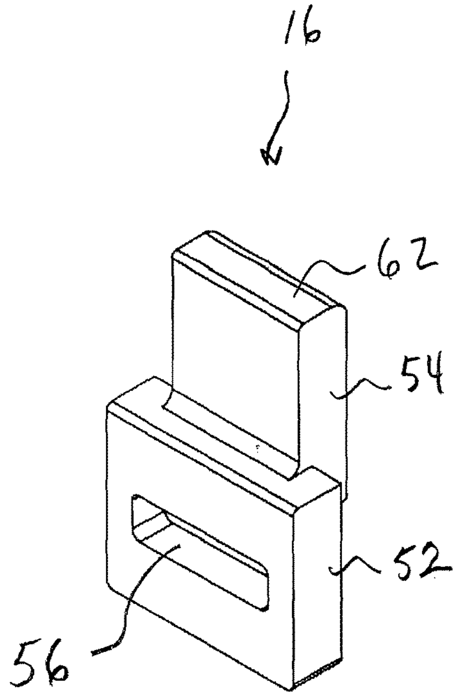
FIGS. 18A-18C illustrate various views of a bolt of a locking device in accordance with an embodiment of the present disclosure, where
Figure 18B:
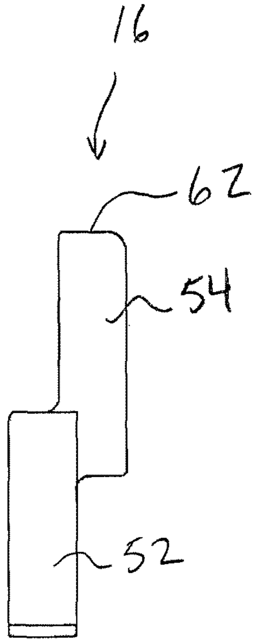
Figure 18C:
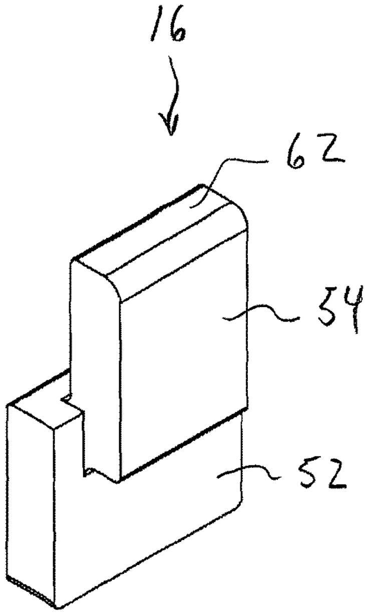

Driver 14 includes a first surface 44 and a second surface 46. The first surface 44 includes a slot 48 that is configured to receive member 42 of core 32. Second surface 46 includes cam 50 which is disposed off-center on second surface 46. Cam 50 is configured to interact with bolt 16 to move bolt 16 into a locked or unlocked position. Referring to FIGS. 18A-18C, bolt 16 is illustrated. Bolt 16 includes a first member 52 which is offset from a second member 54 in a parallel relationship. First member 52 includes slot 56 which is configured to receive cam 50 of driver 14.

Figure 19A:
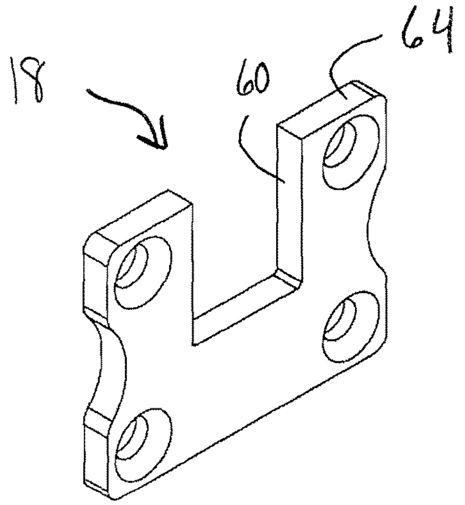
FIG. 19A is a perspective view of an end plate of the locking device and FIG. 19B is a rear view of the end plate shown in FIG. 19A in accordance with an embodiment of the present disclosure.
Figure 19B:
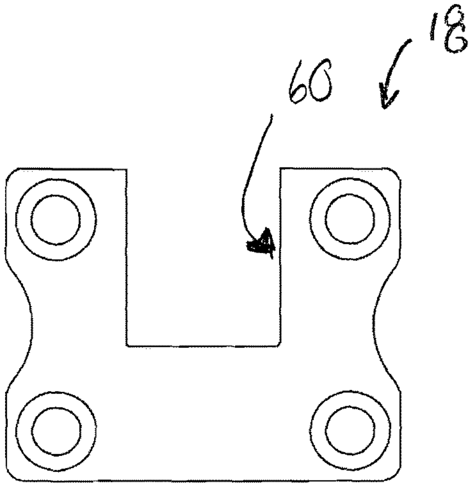

Once a core 32 is disposed in aperture 30 through the front face 22 of housing 12, the driver 14 is disposed in aperture 30 from the rear face 24 of housing 12. The driver 14 is adjusted so member 42 is seated in slot 48. Bolt 16 is then placed in recess 58 of housing 12 such that slot 56 of bolt 16 receives cam 50 of driver 14. The driver 14 and bolt 16 are retained in housing 12 by end plate 18, where end plate 18 is secured to housing 12 by screws 20. As shown in FIGS. 19A and 19B, end plate 18 includes channel 60 which is configured to receive member 54 of bolt 16. As will be described in more detail below, when driver 14 is actuated, bolt 16 will ride in recess 58 of housing 12 and second member 54 of bolt 16 will ride in the channel 60 of end plate 18.

Figure 20A:
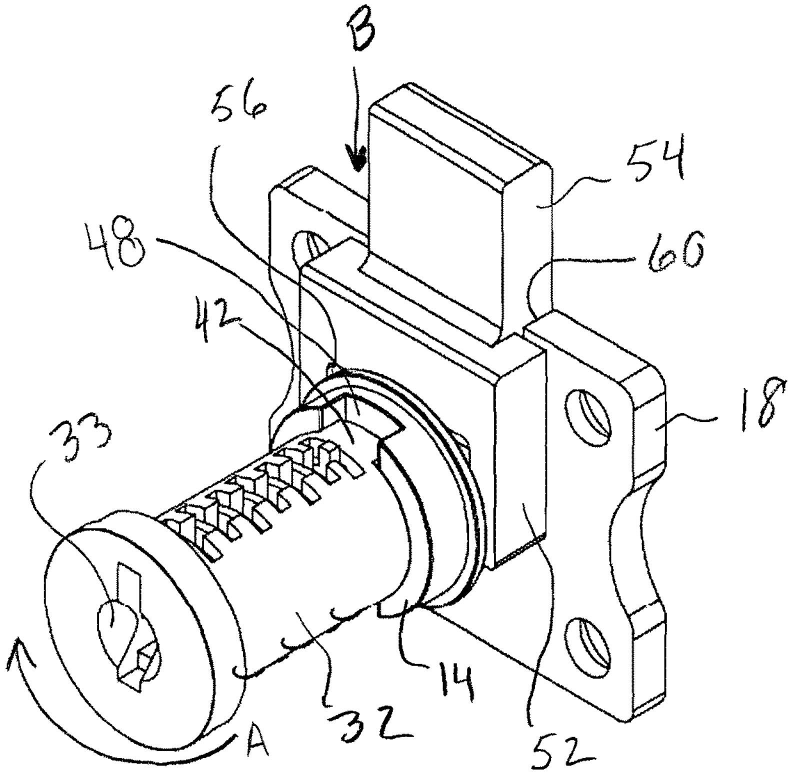
FIG. 20A is a perspective view of core, driver, bolt and end plate with a housing removed in accordance with an embodiment of the present disclosure.
Figure 20B:
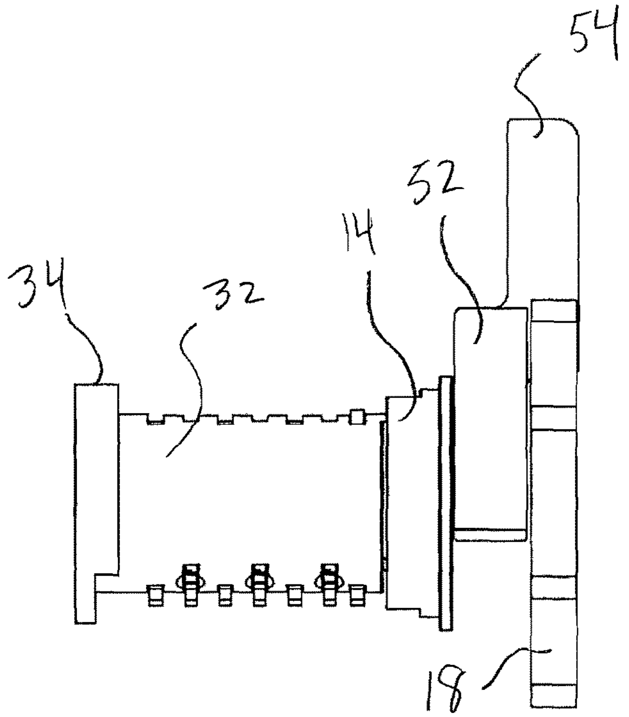
FIG. 20B is a side view of core, driver, bolt and end plate with a housing removed in accordance with an embodiment of the present disclosure.
Figure 21:
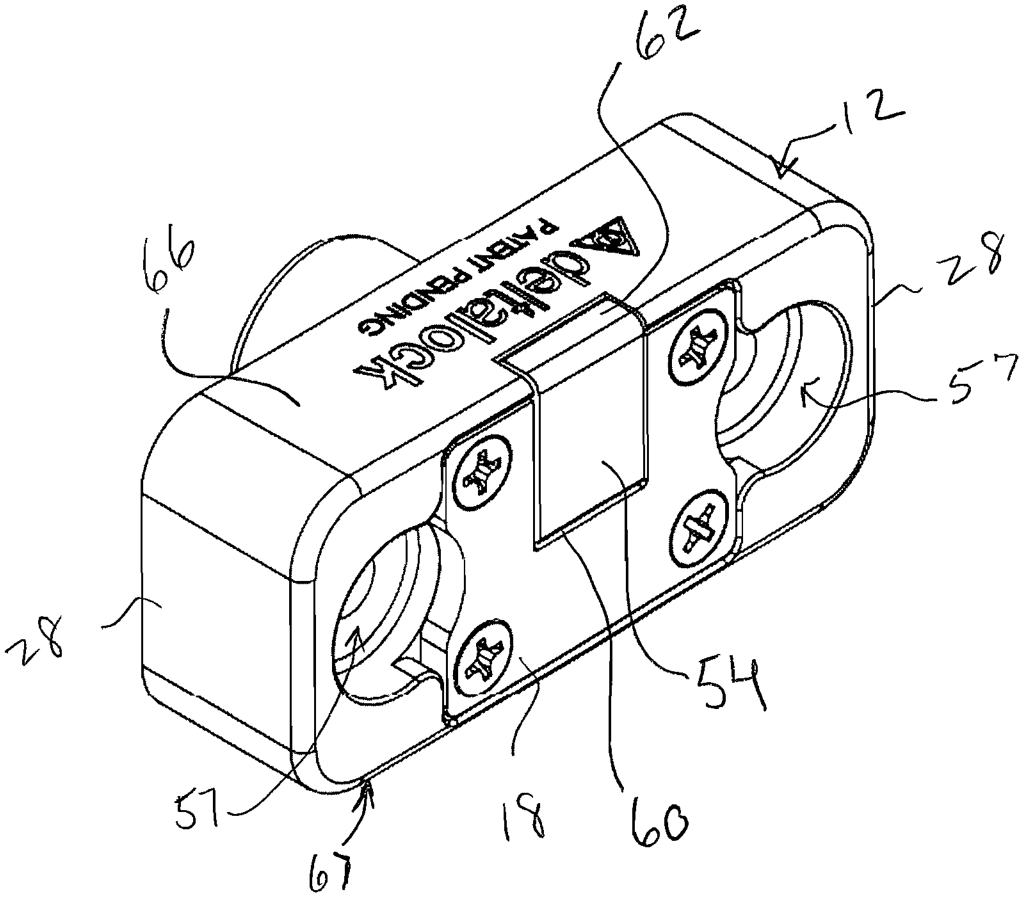
FIG. 21 is a rear perspective view the locking device in an unlocked position in accordance with an embodiment of the present disclosure.
Figure 22A:
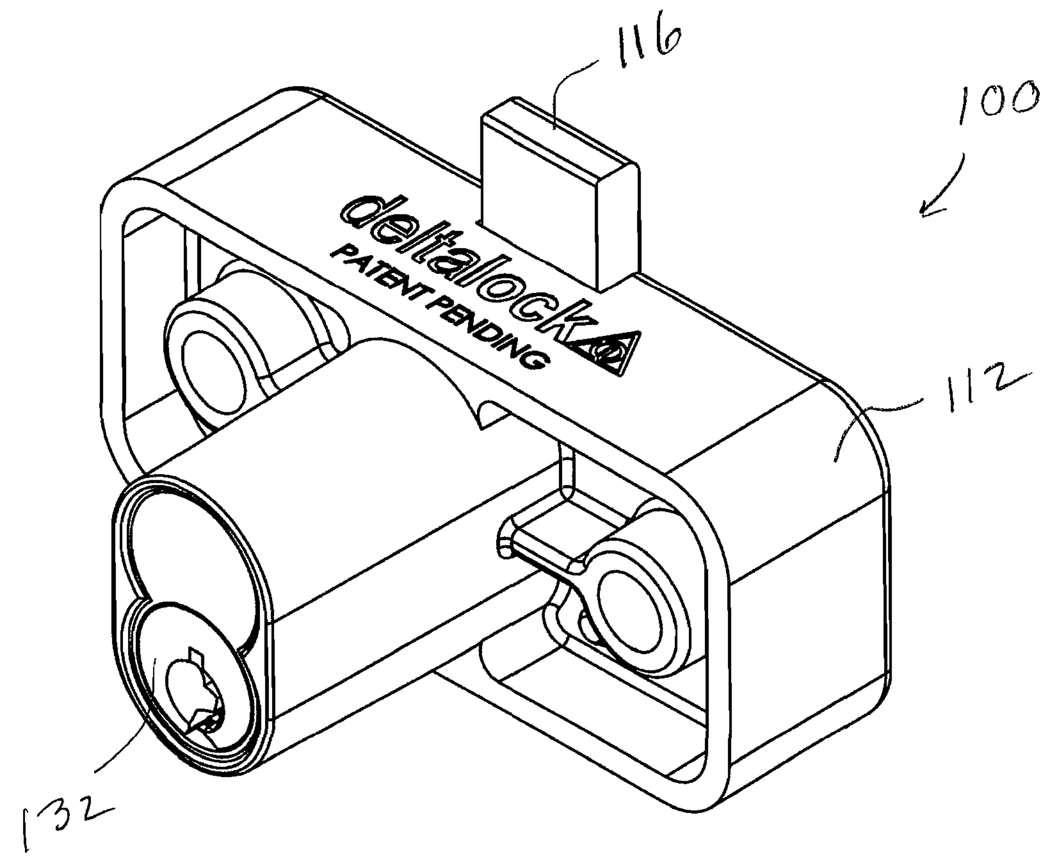
FIG. 22A is a front, perspective view of a locking device in according with a second embodiment of the present disclosure.
Figure 22B:
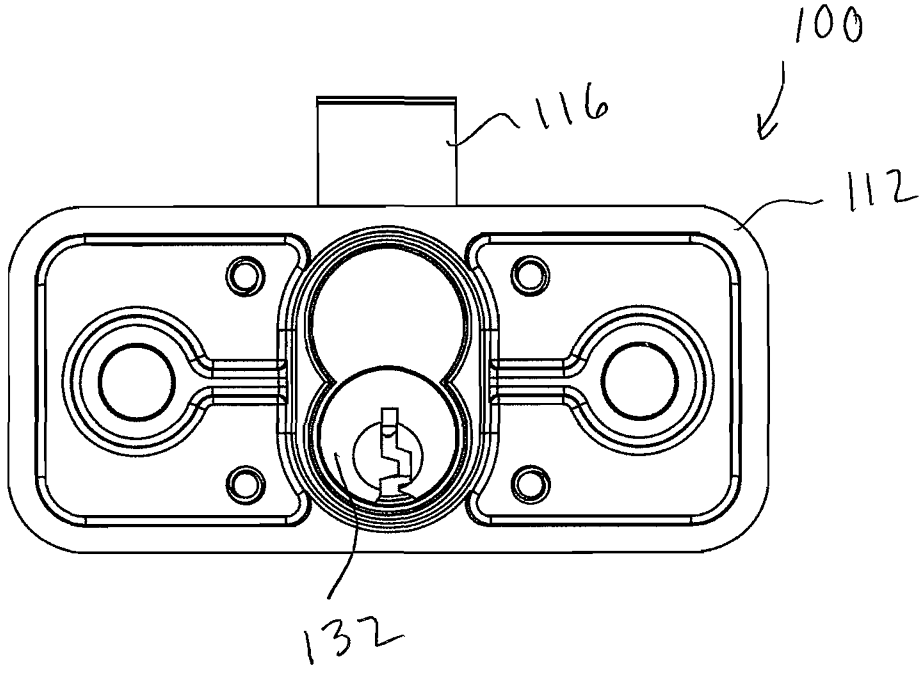
FIG. 22B is a front view of the locking device shown in FIG. 22A in accordance with an embodiment of the present disclosure.
Figure 22C:
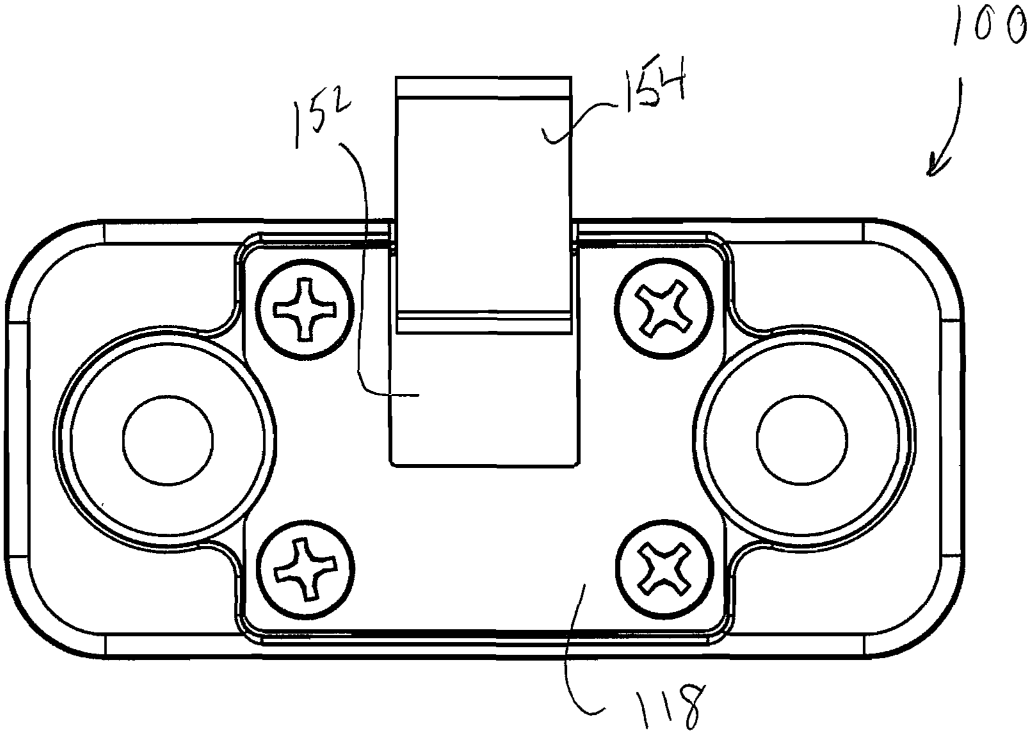
FIG. 22C is a rear view of the locking device shown in FIG. 22A in accordance with an embodiment of the present disclosure.
Figure 22D:
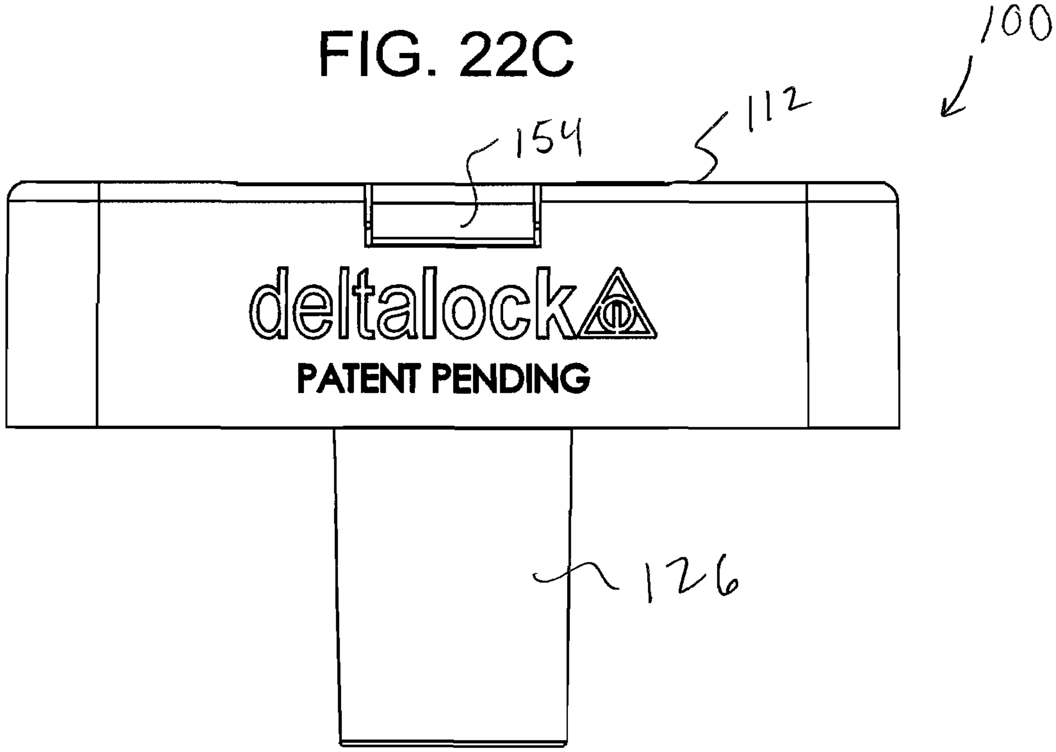
FIG. 22D is a top view of the locking device shown in FIG. 22A in accordance with an embodiment of the present disclosure.
Figure 22E:
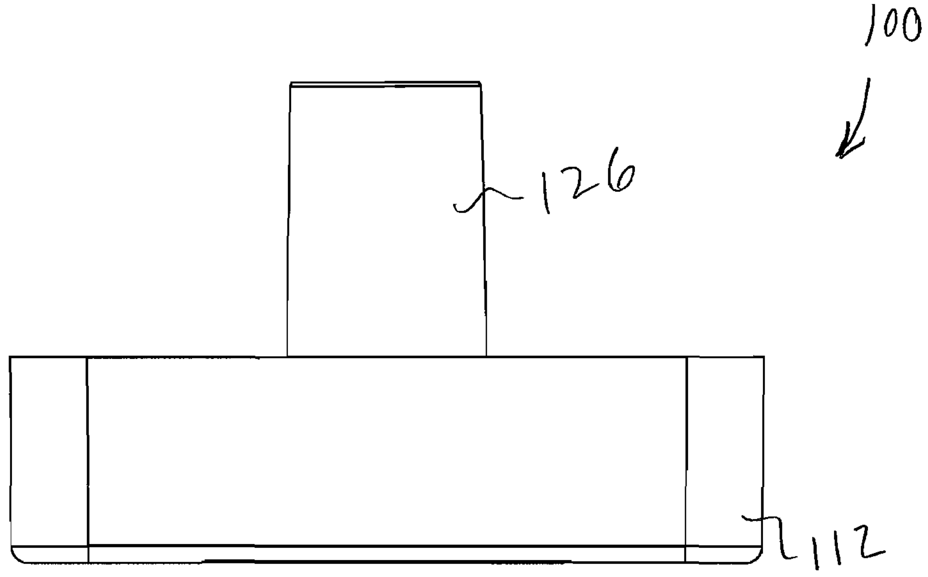
FIG. 22E is a bottom view of the locking device shown in FIG. 22A in accordance with an embodiment of the present disclosure.
Figure 22F:
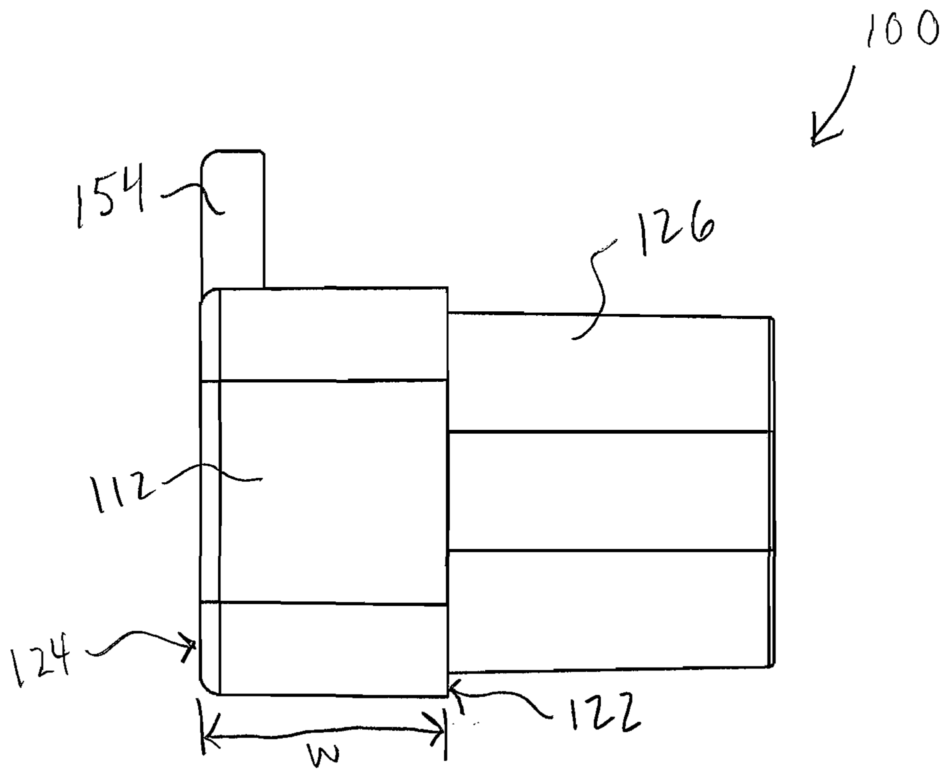
FIG. 22F is a left side view of the locking device shown in FIG. 22A in accordance with an embodiment of the present disclosure.
Figure 22G:
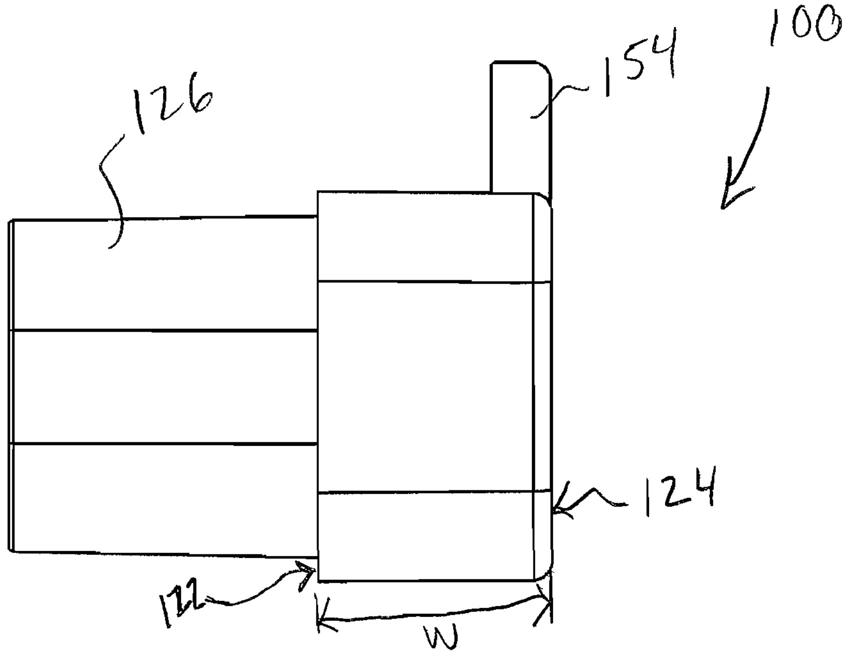
FIG. 22G is a right side view of the locking device shown in FIG. 22A in accordance with an embodiment of the present disclosure.
Figure 22H:
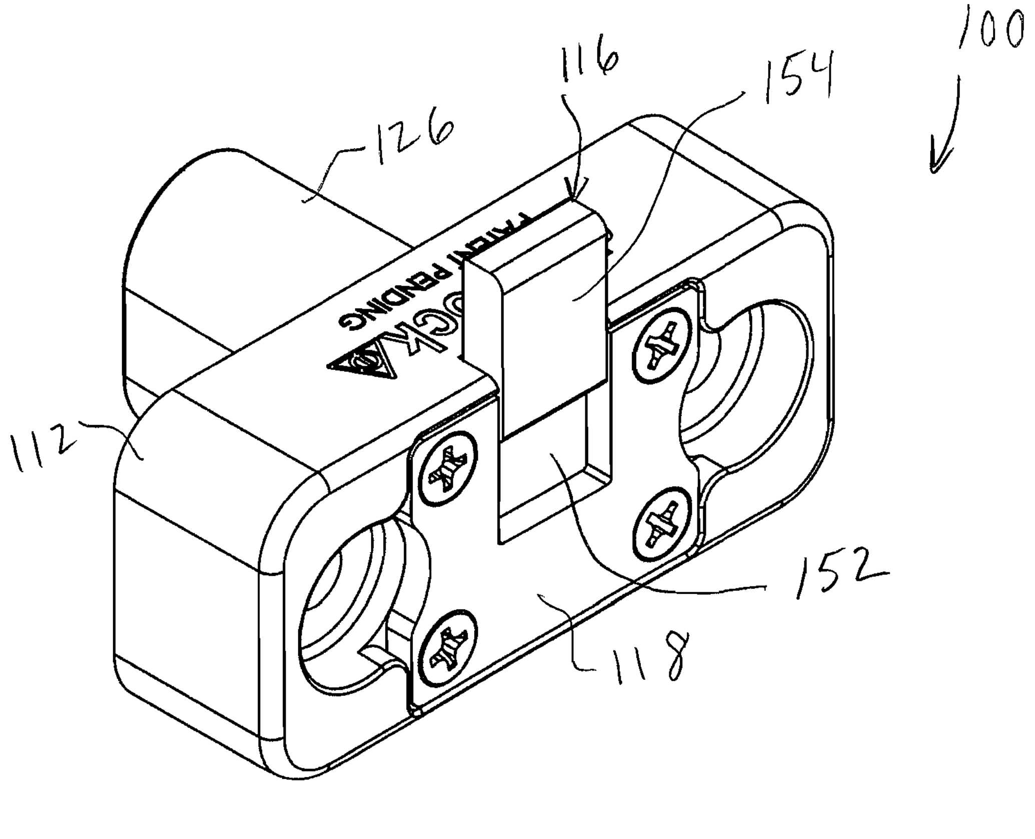
FIG. 22H is a rear, perspective view of the locking device shown in FIG. 22A in accordance with an embodiment of the present disclosure.

Referring to FIGS. 20A and 20B, the operation of the locking device 10 will be described. In FIGS. 20A and 20B, the housing 12 has been removed to illustrate the internal details of the locking device 10. FIGS. 20A and 20B illustrate the locking device 10 in the locked position, i.e., the bolt 16 has been actuated and member 54 is disposed in a recess of a structure, e.g., a cabinet, desk, etc. Upon an appropriate key being inserted into keyhole 33, the key may be rotated in the direction indicated by arrow A in FIG. 20A. Core 32 will rotate in the same direction causing member 42 to subsequently rotate in the same direction. The rotation of member 42 will cause driver 14 to rotate. Due to the rotation of driver 14, cam 50, disposed in slot 56, will cause bolt 16 to move in the direction of arrow B in recess 58 of housing 12. Additionally, member 54 of bolt 16 will move in direction of arrow B in the channel 60 of end plate 18. When member 54 is completely seated in channel 60, a top portion 62 of member 54 will be approximately even with a top wall 66 of housing 12, as shown in FIG. 21. In this manner, the bolt 16 will be recessed into the housing 12 no longer being disposed in the recess of the structure allowing the drawer the locking device is mounted on to be opened.

Figure 39A:
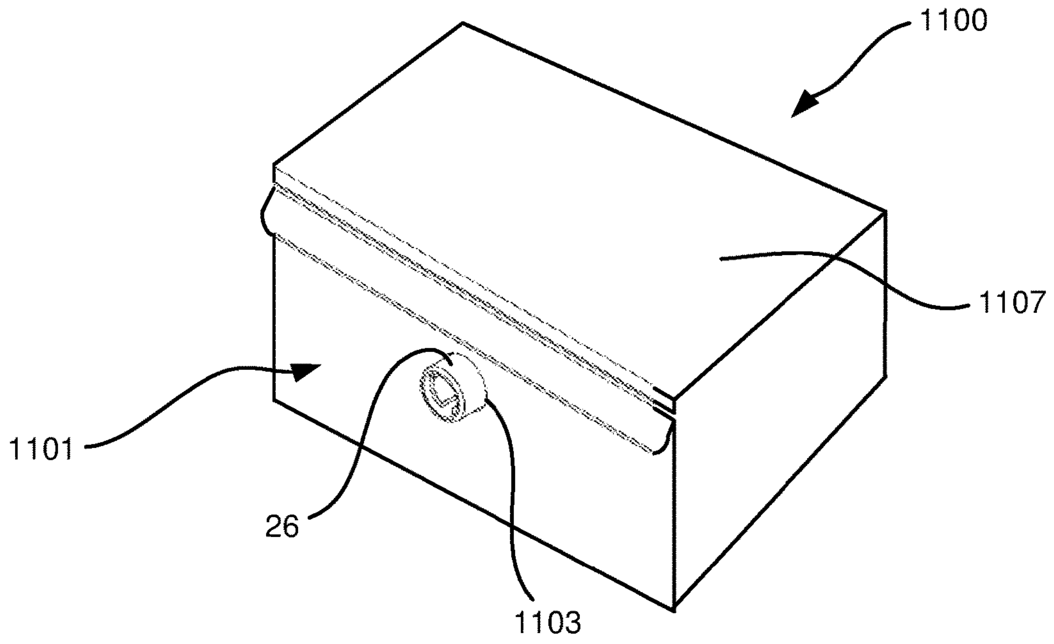
FIG. 39A is a perspective view of a locking device mounted to a structure in accordance with an embodiment of the present disclosure.
Figure 39B:
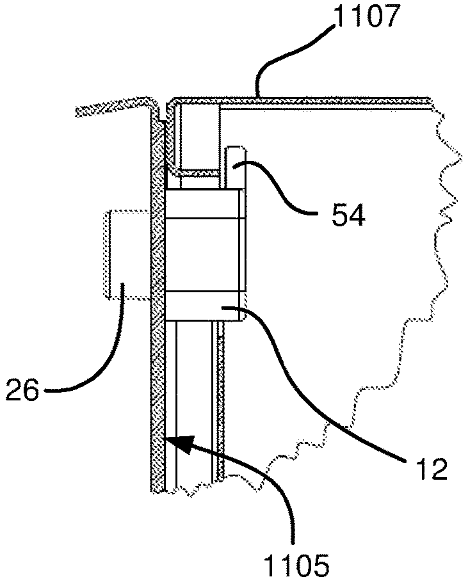
FIG. 39B is a cross section view of a locking device of the present disclosure mounted to a structure.
Figure 39C:
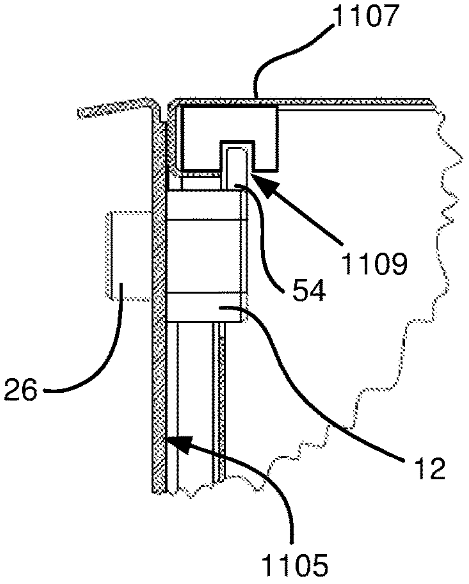
FIG. 39C is a cross section view of a locking device of the present disclosure in accordance with another embodiment.

It is to be appreciated that the locking device 10 is to be mounted on an inner surface of a drawer to be secured. Referring to FIGS. 39A-39C, a structure 1100, e.g., a cabinet, including a drawer 1101 is illustrated. It is to be appreciated that the structure may be a desk, display cabinet or any other structure including a drawer. The drawer 1101 may include an aperture 1103 that is slightly larger than the circumference of member or barrel 26. The inner surface 1105 of the drawer 1101 may include mounting screws extending from the inner surface 1105 of the drawer 1101 on both side of the aperture in the drawer 1101. The housing 12 includes mounting holes 51 to receive the mounting screws, as best shown in FIGS. 15A-15C. The mounting holes 51 extend from inner surface 53 of the housing 12 a predetermined distance. Additionally, a leg 55 couples each mounting hole 51 to member 26 to give structural support to the mounting holes 51, i.e., to prevent the mounting holes 51 from warping. When mounting the locking device 10, member 26 is inserted into the aperture 1103 in the drawer 1101 while the mounting screws align with the mounting holes 51 until the front face 22 of housing 12 comes into contact with the inner surface 1105 of the drawer. The locking device 10 is then secured by fasteners, e.g., a nut, coupled to the mounting screws. As shown in FIG. 15C, the rear face 24 of the housing 12 includes circular recesses 57 to receive the fasteners. It is to be appreciated that other means may be employed for securing the locking device to the drawer including, but not limited to, rivets, bolts, glue, etc.

As shown in FIG. 39B, when in the locked position, the second member 54 of bolt 16 is extended and makes contact with a portion of top surface 1107 of structure 1100 preventing the drawer 1101 from being open. In another embodiment, as shown in FIG. 39C, the top surface 1107 of drawer 1100 may include a recess or slot 1109 configured to receive the second member 54 of bolt 16, which when bolt 16 is extended, the second member 52 enters the recess 1109 preventing the drawer 1101 from opening. In a further embodiment, the top surface 1107 of the structure 1100 may include a strike plate (not shown) configured to received the second member 52 of the bolt 16.

Referring to FIGS. 22A-29B, various views of a locking device 100 in accordance with another embodiment of the present disclosure are provided. Components of locking device 100 that are similarly numbered to corresponding components of locking device 10 shown in FIGS. 1-21 are configured in the manner and with the features described above and may not be described again below in the interest of brevity.

Figure 23:
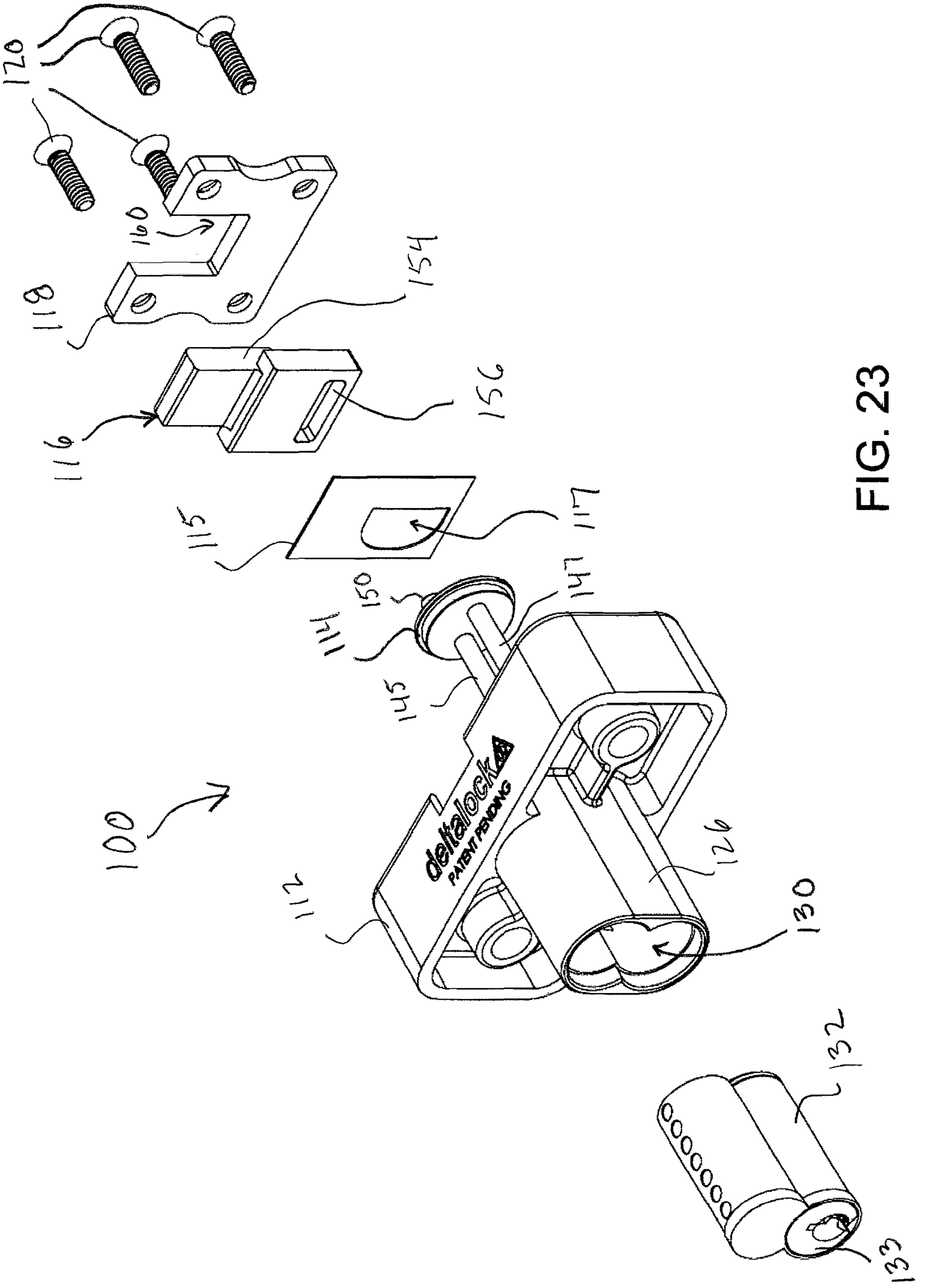
FIG. 23 is a front, perspective exploded view of the locking device shown in FIG. 22 in accordance with an embodiment of the present disclosure.
Figure 24:
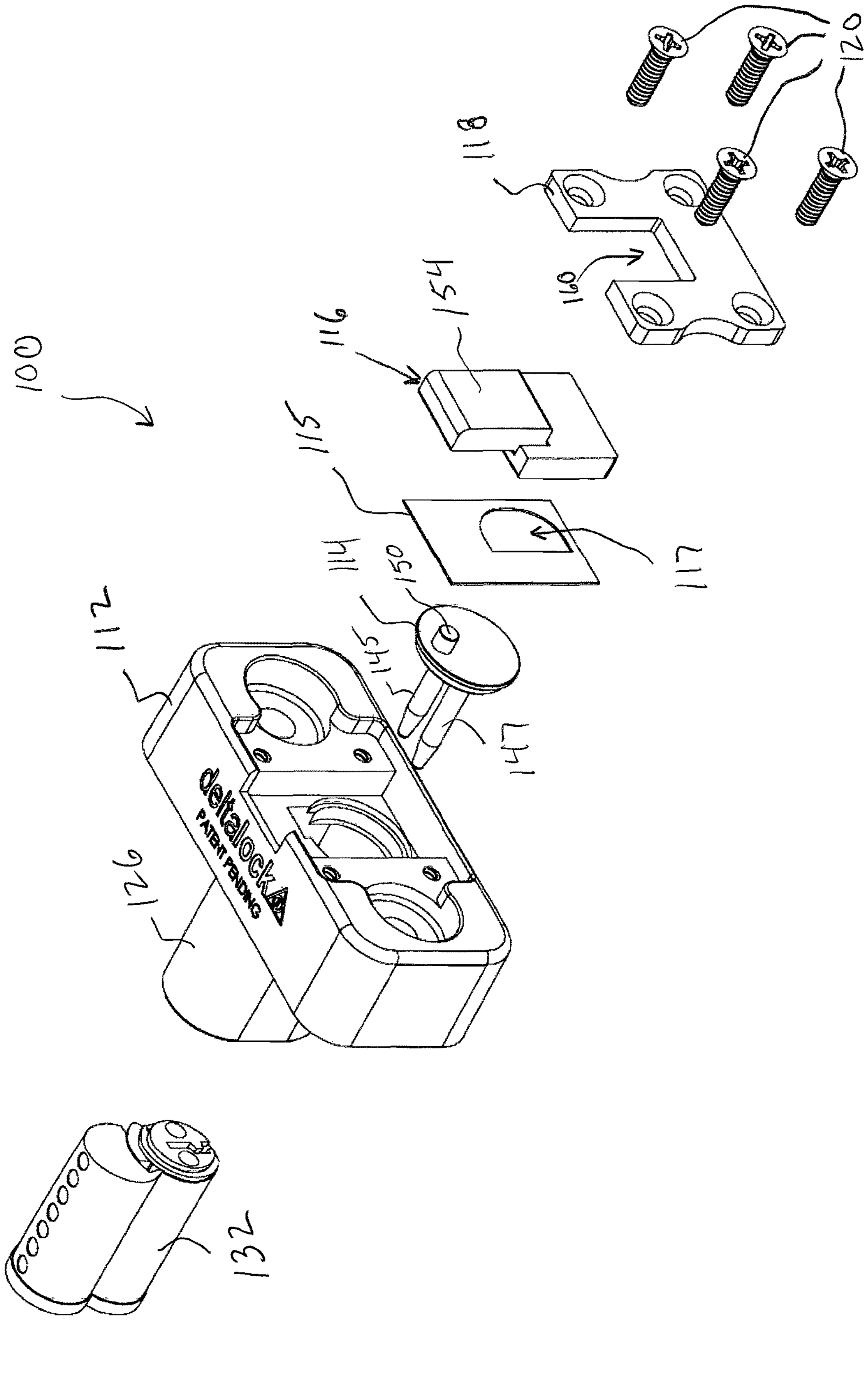
FIG. 24 is a rear, perspective exploded view of the locking device shown FIG. 22A in accordance with an embodiment of the present disclosure.
Figure 25:
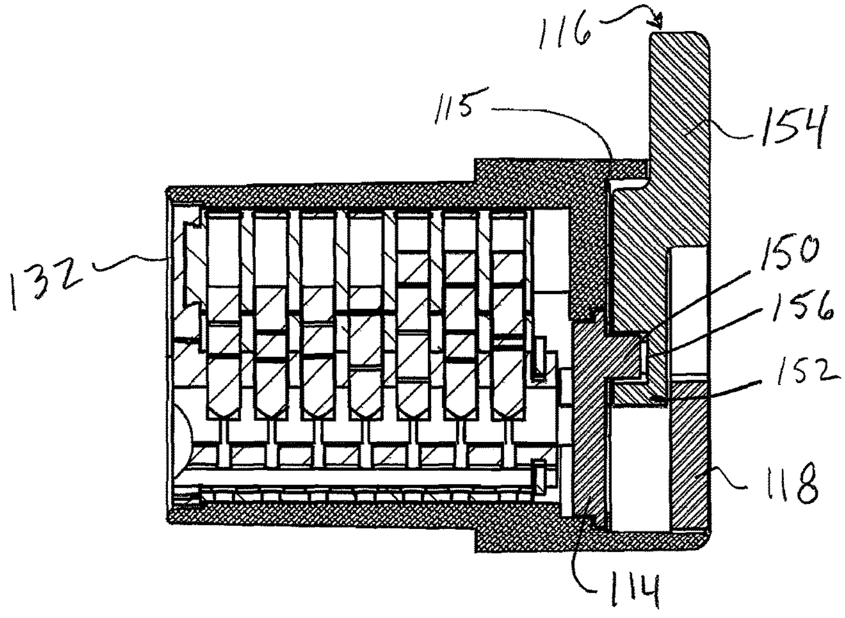
FIG. 25 is a cross sectional view of the locking device as shown in FIG. 22G.

Referring to FIGS. 23 and 24, exploded views of the locking device 100 are provided. The locking device 100 includes a housing 112, a driver 114, a retaining plate 115, bolt 116, an end plate 118 and screws 1120. In this embodiment, the housing 112 is generally rectangular and includes a front face 122 and a rear face 124 face separated by a predetermined width w. The front face 122 includes a cylindrical member or barrel 126 that extends perpendicular to an outer wall 128 of the housing 112. The cylindrical member 126 includes an aperture 130 configured to receive a core 132.

Figure 27A:
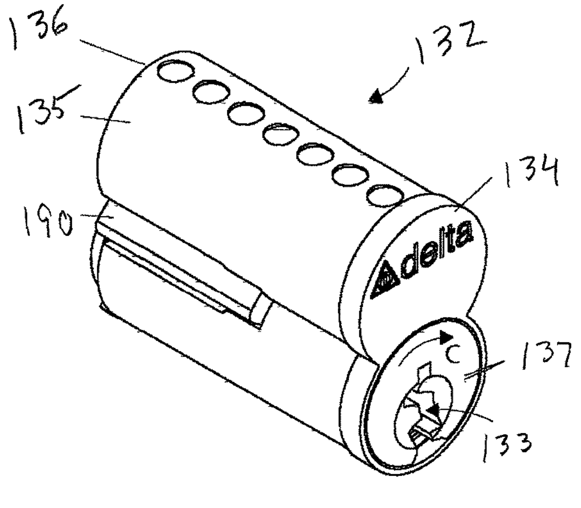
FIG. 27A is a front, perspective view of a core of a locking device in accordance with another embodiment of the present disclosure.
Figure 27B:
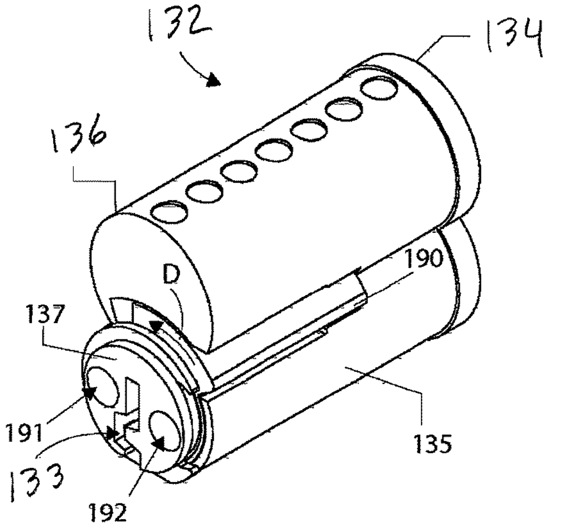
FIG. 27B is a rear, perspective view of a core of a locking device in accordance with another embodiment of the present disclosure.
Figure 28A:
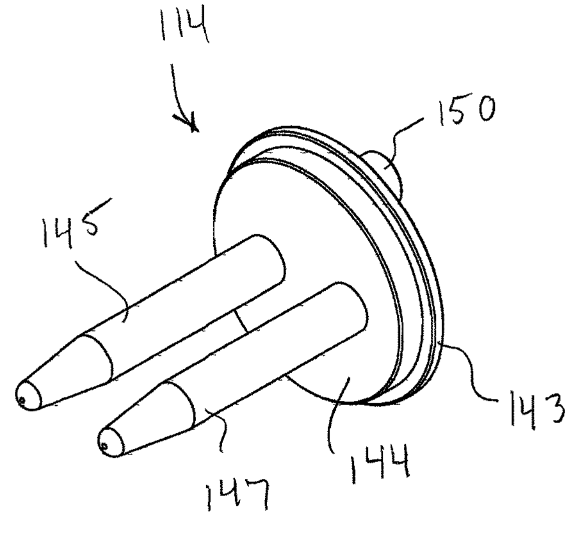
FIGS. 28A-28B illustrate various views of a driver of a locking device in accordance with another embodiment of the present disclosure.
Figure 28B:
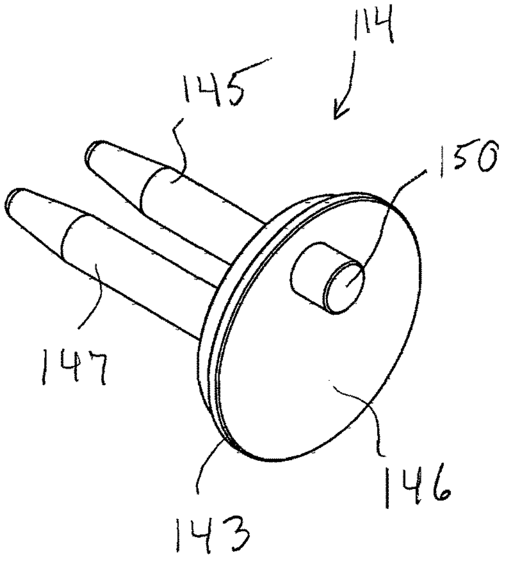

As shown in FIGS. 27A and 27B, core 132, e.g., a small format interchangeable core (SFIC), is generally cylindrical and includes a first end 134 and a second 136. As shown in FIGS. 27A and 27B, SFIC 132 includes an SFIC housing 135 having ends 134 and 136. A cylinder 137 extends along the longitudinal axis from end 134 to end 136 of SFIC 132. Keyhole or keyway 133 is disposed through cylinder 137 from ends 134, 136 along longitudinal axis. SFIC 132 also includes an engaging element 190 and channels 191, 192, where channels 191, 192 extend along longitudinal axis into the interior of SFIC 132. When a proper or operating key is inserted into keyhole 133 of SFIC 132, a plurality of tumblers within SFIC 132 align to allow cylinder 137 to be rotated, for example in a direction C shown in FIG. 27A, to lock and unlock device 100, as will be described in greater detail below. In one embodiment, when a master or control key (different than the key used to lock and unlock locking device 100) is inserted into keyhole 133 and rotated in a direction C, SFIC 132 is configured such that engaging element 190 may be drawn toward the interior of SFIC 132, as indicated by arrow D in FIG. 27B. It is to be appreciated that SFIC 132 includes a spring or coil within the interior of SFIC 132 that biases engaging element 190 in a direction opposite to arrow D away from SFIC 132 (i.e., perpendicularly to the longitudinal axis).

Driver 114 includes a circular plate or disc 143 having a first surface 144 and a second surface 146. The first surface 144 of the disc 143 includes a first prong 145 and a second prong 147 extending perpendicularly from the first surface 144. Second surface 146 includes cam 150 which is disposed off-center on second surface 146. Cam 150 is configured to interact with bolt 116 to move bolt 116 into a locked or unlocked position. It is to be appreciated that bolt 116 is similar to bolt 16 shown in FIGS. 18A-18C, and the description of same will not be repeated for conciseness.

Referring again to FIG. 27B, channels 191, 192 of SFIC 132 are configured to receive prongs 145 and 147, respectively, of driver 114 to couple driver 114 to SFIC 132. When a proper key is inserted into keyhole 133 and rotated in a first direction (e.g., direction C), cylinder 137 is also rotated in the first direction, thereby rotating channels 191, 192 and driver 114 in the first direction.

When a master or control key (different than the key used to lock and unlock locking device 100) is inserted into keyhole 133 and rotated in a direction C, SFIC 132 is configured such that engaging element 190 may be drawn toward the interior of SFIC 132, as indicated by arrow D in FIG. 27B. Once a core 132 is disposed in aperture 130 through the front face 122 of housing 112, the control key may be rotated in a direction opposite arrow C to enable the engaging element 190 to move in the direction opposite arrow D and thus enabling the engaging element 190 to interact with an interior surface of aperture 130 of housing 112 to secure the core 132 in the housing 112.

Once a core 132 is disposed in aperture 130 through the front face 122 of housing 112, the driver 114 is disposed in aperture 130 from the rear face 124 of housing 112. Channels 191, 192 of SFIC 132 are configured to receive prongs 145 and 147, respectively, of driver 114 and then retention plate 115 is disposed in recess 158 over the second surface 146 of the driver 114. The retention plate 15 includes an aperture 117 (e.g., a semi-circular aperture) which is configured to limit the motion of the cam 150 of driver 114.

Bolt 116 is then placed in recess 158 of housing 112 such that slot 156 of bolt 116 receives cam 150 of driver 114. The driver 114 and bolt 116 are retained in housing 112 by end plate 118, where end plate 118 is secured to housing 112 by screws 120. As shown in FIGS. 23 and 24, end plate 118 includes channel 160 which is configured to receive member 154 of bolt 116. As will be described in more detail below, when driver 114 is actuated, bolt 116 will ride in recess 158 of housing 112 and second member 154 of bolt 116 will ride in the channel 160 of end plate 118.

Figure 29A:
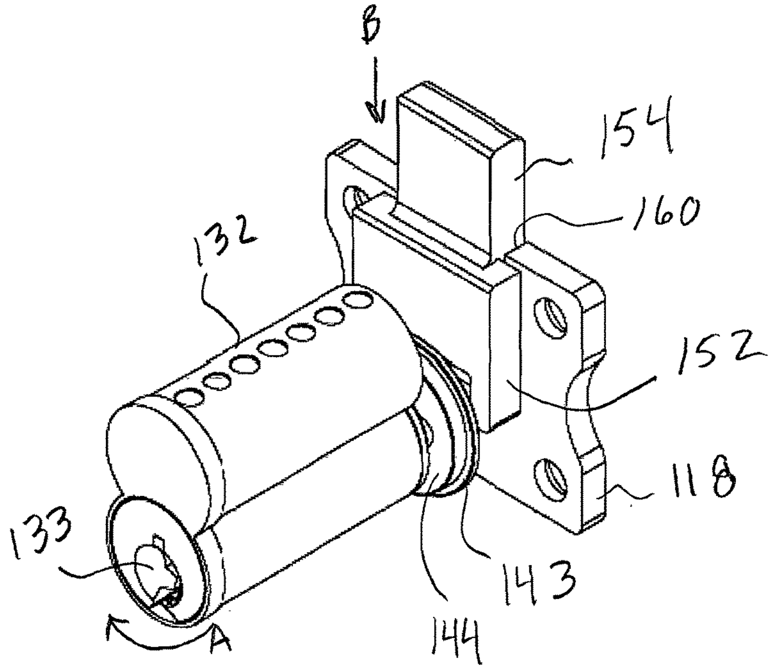
FIG. 29A is a perspective view of core, driver, bolt and end plate with a housing removed in accordance with an embodiment of the present disclosure.
Figure 29B:
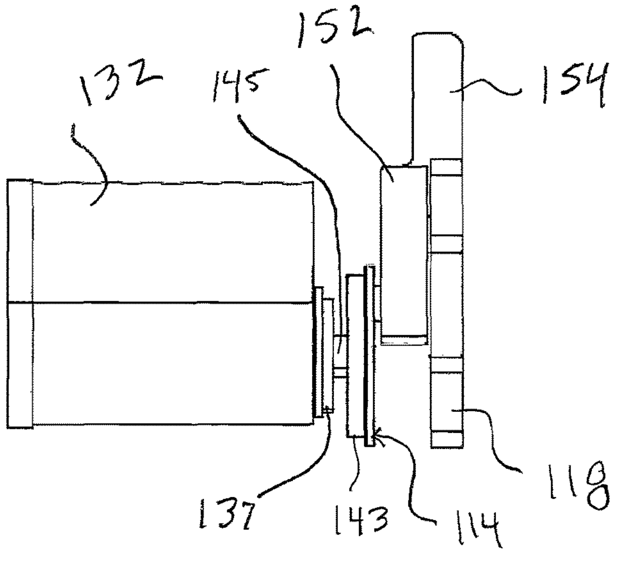
FIG. 29B is a side view of core, driver, bolt and end plate with a housing removed in accordance with an embodiment of the present disclosure.

Referring to FIGS. 29A and 29B, the operation of the locking device 100 will be described. In FIGS. 29A and 29B, the housing 112 has been removed to illustrate the internal details of the locking device 100. FIGS. 29A and 29B illustrate the locking device 100 in the locked position, i.e., the bolt 116 has been actuated and member 154 is disposed in a recess of a structure, e.g., a cabinet, desk, etc. Upon an appropriate key being inserted into keyhole 133, the key may be rotated in the direction indicated by arrow A in FIG. 29A. Cylinder 137 will rotate in the same direction causing channels 191, 192 to subsequently rotate in the same direction. The rotation of channels 191, 192 will cause driver 114 to rotate. Due to the rotation of driver 114, cam 150, disposed in slot 156, will cause bolt 116 to move in the direction of arrow B in recess 158 of housing 112. Additionally, member 154 of bolt 116 will move in direction of arrow B in the channel 160 of end plate 118. When member 154 is completely seated in channel 160, a top portion 162 of member 154 will be approximately even with a top wall 166 of housing 112 (as similarly shown in FIG. 21). In this manner, the bolt 116 will be recessed into the housing 112 no longer being disposed in the recess of the structure allowing the drawer the locking device is mounted on to be opened.

Figure 26A:
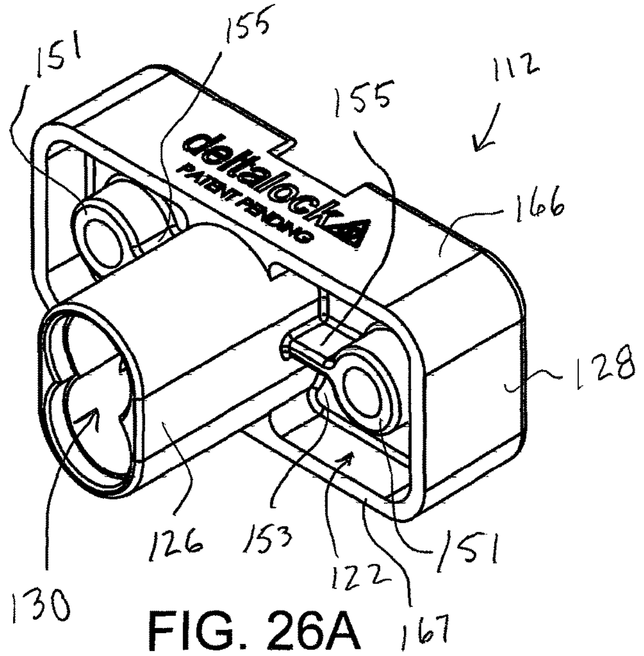
FIG. 26A is a front, perspective view of a housing of a locking device in accordance with another embodiment of the present disclosure.
Figure 26B:
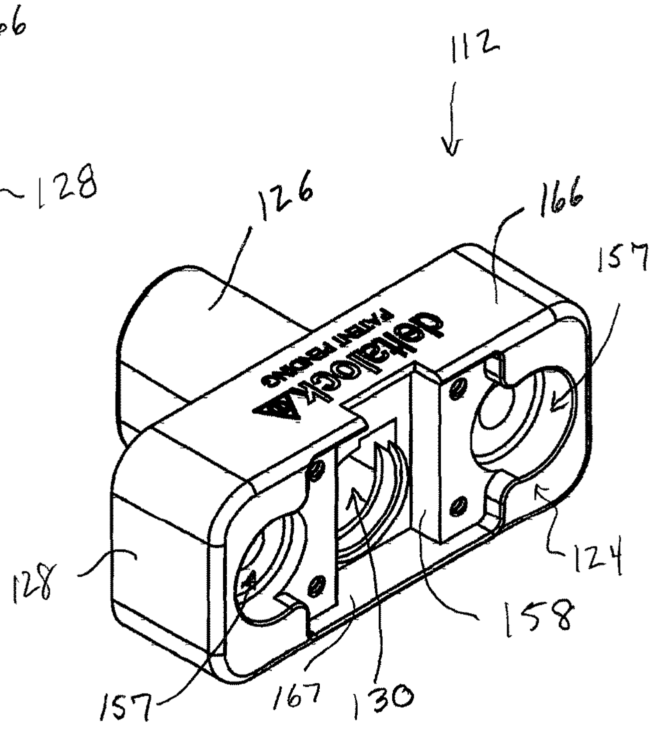
FIG. 26B is a rear, perspective view of a housing of a locking device in accordance with another embodiment of the present disclosure.

It is to be appreciated that the locking device 100 is to be mounted on an inner surface of a drawer to be secured, similar to that described above in FIGS. 39A-39C. For example, the drawer may include an aperture that is slightly larger than the outer edge of member 126. The inner surface of the drawer may include mounting screws extending from the inner surface of the drawer on both side of the aperture in the drawer. The housing 112 includes mounting holes 151 to receive the mounting screws, as best shown in FIGS. 26A-26B. The mounting holes 151 extend from inner surface 153 of the housing 112 a predetermined distance. Additionally, a leg 155 couples each mounting hole 151 to member 126 to give structural support to the mounting holes 151, i.e., to prevent the mounting holes 151 from warping. When mounting the locking device 100, member 126 is inserted into the aperture in the drawer while the mounting screws align with the mounting holes 151 until the front face 122 of housing 112 comes into contact with the inner surface of the drawer. The locking device 100 is then secured by fasteners, e.g., a nut, coupled to the mounting screws. As shown in FIG. 26B, the rear face 124 of the housing 112 includes circular recesses 157 to receive the fasteners. It is to be appreciated that other means may be employed for securing the locking device to the drawer including, but not limited to, rivets, bolts, glue, etc.

Figure 30A:
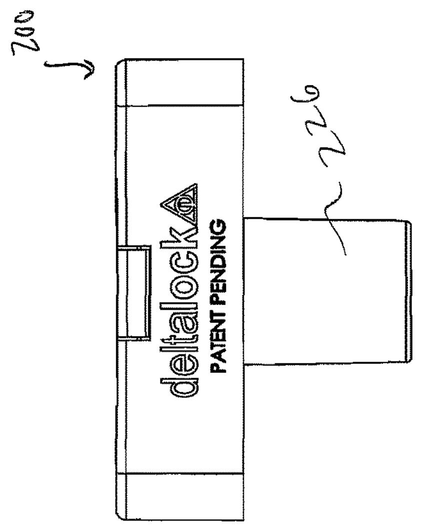
FIGS. 30A-30F illustrate various views of a locking device in accordance with a third embodiment of the present disclosure.
Figure 30B:
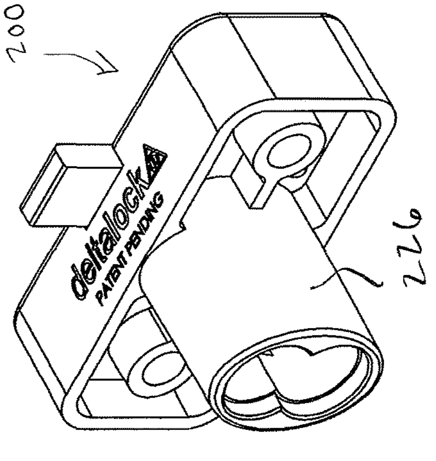
Figure 30C:
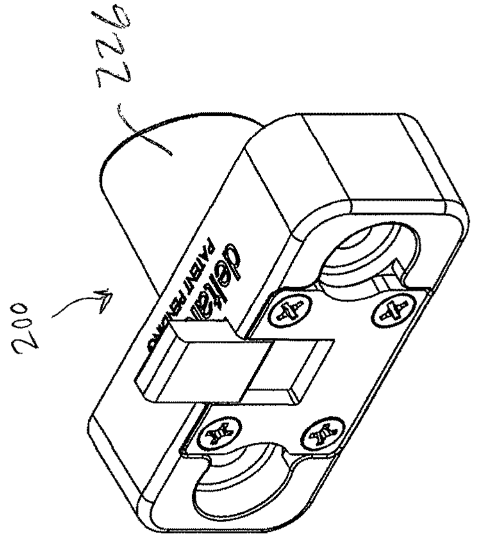
Figure 30D:
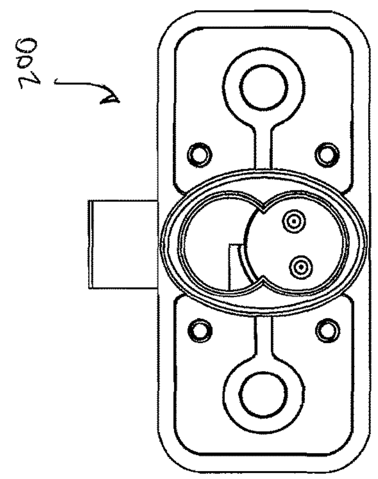
Figure 30E:
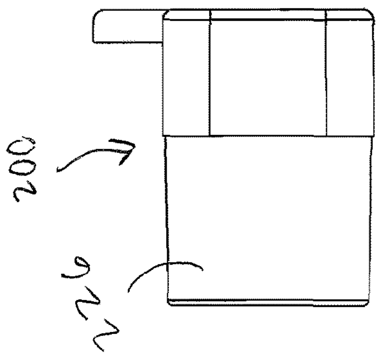
Figure 30F:
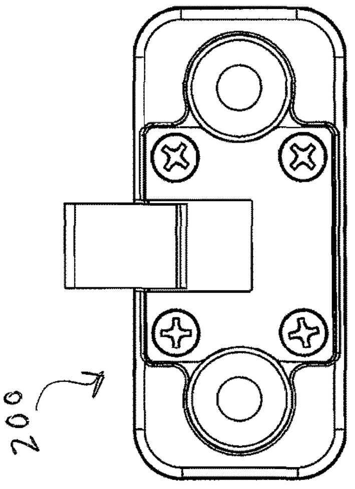

It is to be appreciated that the housing and barrel of the locking device of the present disclosure may take many forms and shapes and still will remain with the scope of the present disclosure. For example, FIGS. 30A-30F illustrates various views of a third embodiment of a locking device 200 with an oval barrel 226, where FIG. 30A is a top view, FIG. 30B is a front perspective view, FIG. 30C is a rear perspective view, FIG. 30D is a front view, FIG. 30E is a side view and FIG. 30F is a rear view.

Figure 31C:
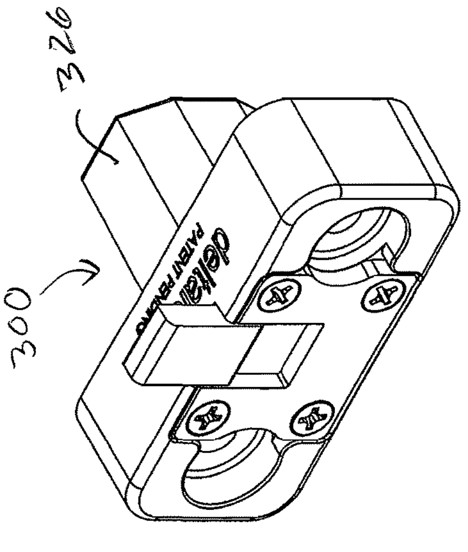
FIGS. 31A-31F illustrate various views of a locking device in accordance with a fourth embodiment of the present disclosure.
Figure 31F:
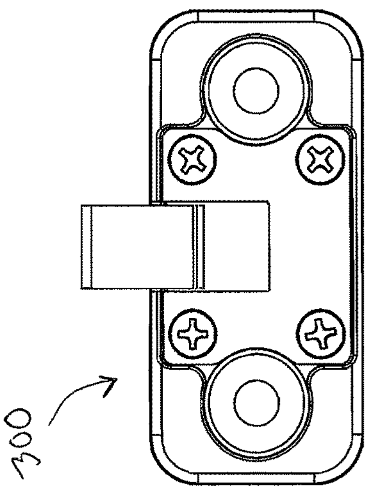
Figure 31B:
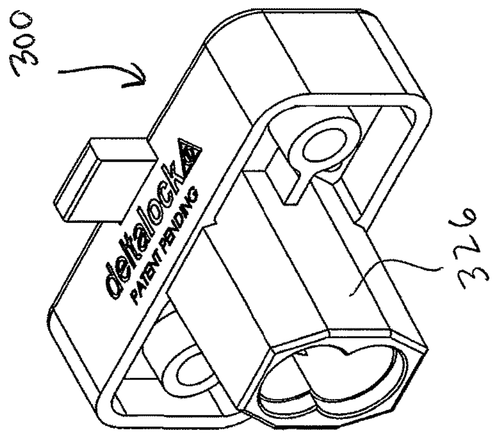
Figure 31E:
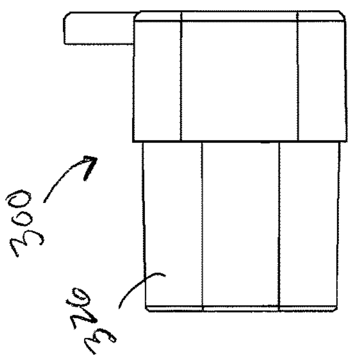
Figure 31A:
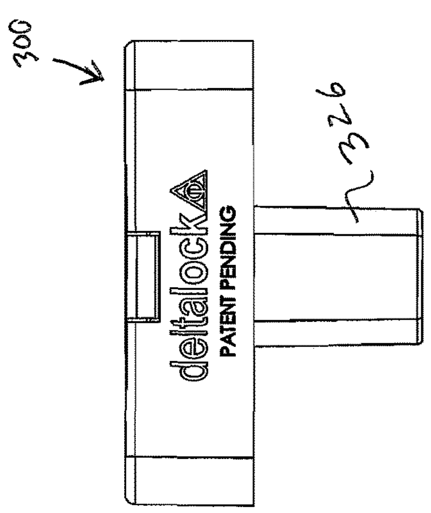
Figure 31D:
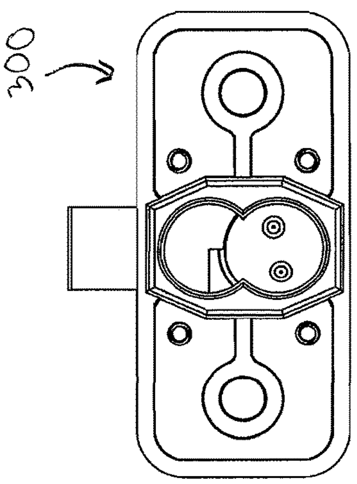

In another example, FIGS. 31A-31F illustrates various views of a fourth embodiment of a locking device 300 with a faceted barrel 326, where FIG. 31A is a top view, FIG. 31B is a front perspective view, FIG. 31C is a rear perspective view, FIG. 31D is a front view, FIG. 31E is a side view and FIG. 31F is a rear view.

Figure 32A:
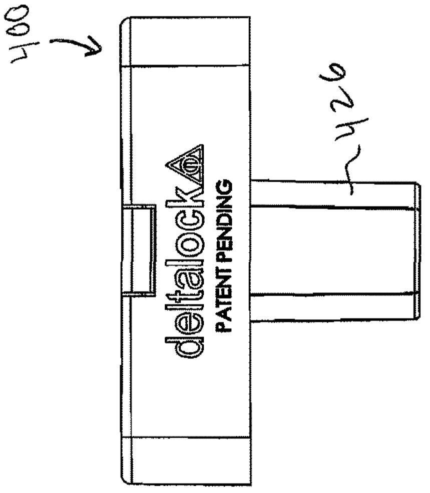
FIGS. 32A-32F illustrate various views of a locking device in accordance with a fifth embodiment of the present disclosure.
Figure 32B:
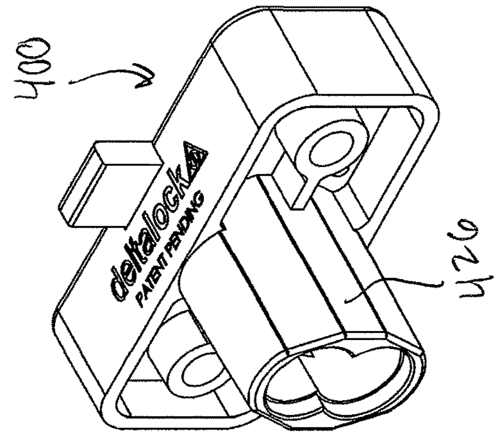
Figure 32C:
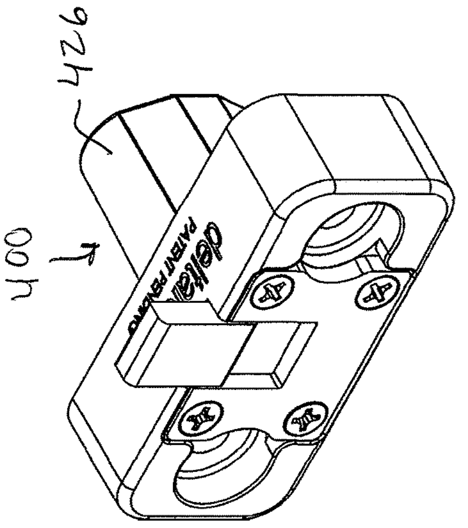
Figure 32D:
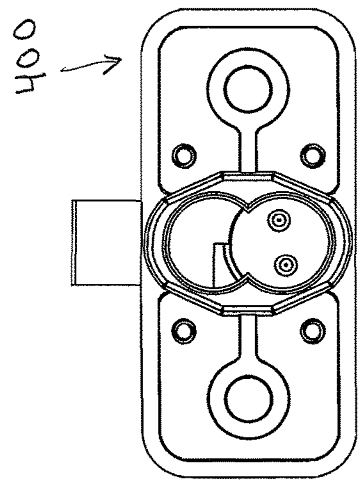
Figure 32E:
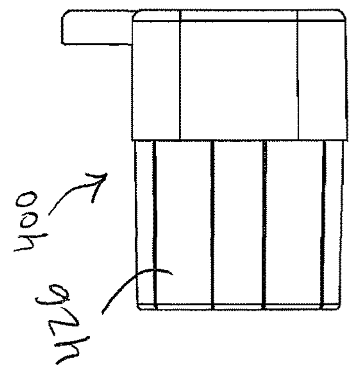
Figure 32F:
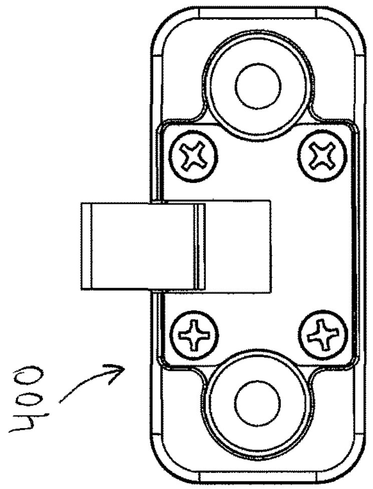

In a further example, FIGS. 32A-32F illustrates various views of a fifth embodiment of a locking device 400 with a faceted-round barrel 426, where FIG. 32A is a top view, FIG. 32B is a front perspective view, FIG. 32C is a rear perspective view, FIG. 32D is a front view, FIG. 32E is a side view and FIG. 32F is a rear view.

Figure 33A:
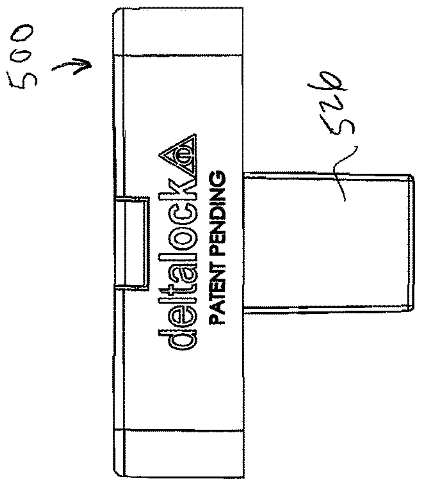
FIGS. 33A-33F illustrate various views of a locking device in accordance with a sixth embodiment of the present disclosure.
Figure 33B:
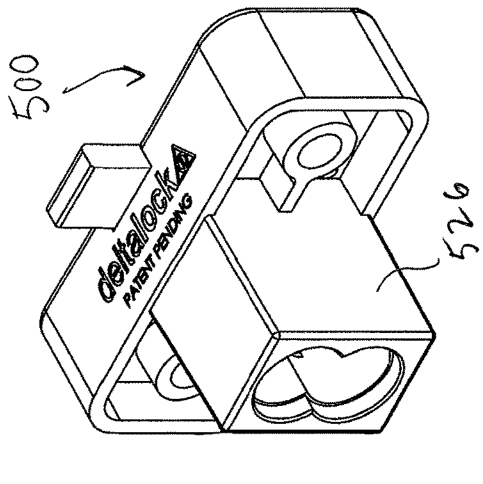
Figure 33C:
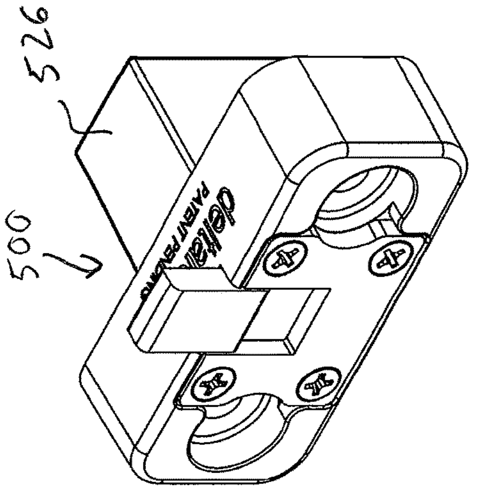
Figure 33D:
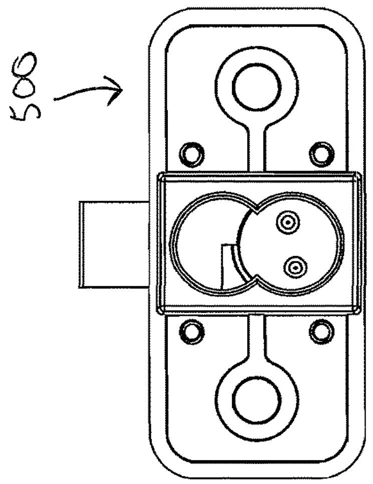
Figure 33E:
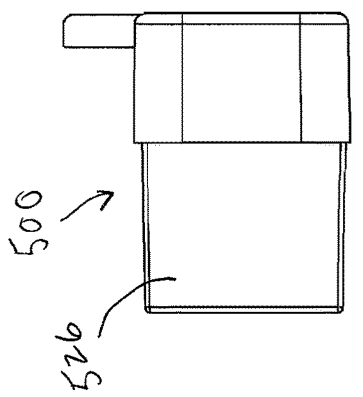
Figure 33F:
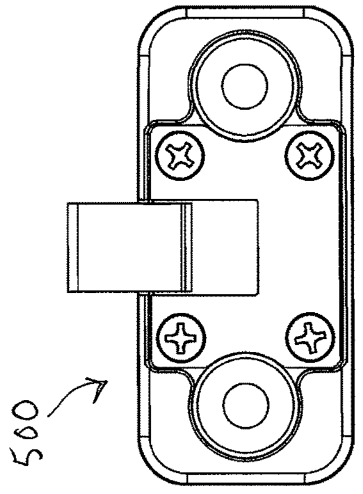

In another example, FIGS. 33A-33F illustrates various views of a sixth embodiment of a locking device 500 with a rectangular barrel 526, where FIG. 33A is a top view, FIG. 33B is a front perspective view, FIG. 33C is a rear perspective view, FIG. 33D is a front view, FIG. 33E is a side view and FIG. 33F is a rear view.

Figure 34A:
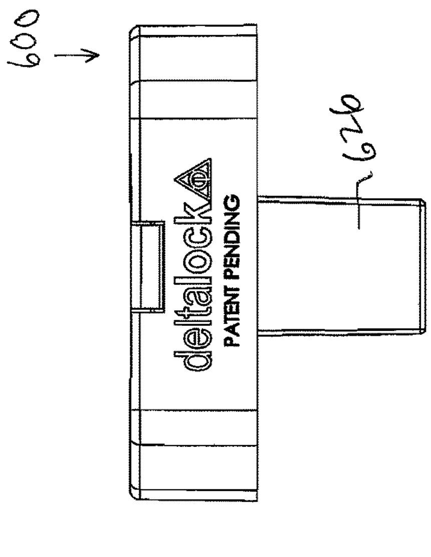
FIGS. 34A-34F illustrate various views of a locking device in accordance with a seventh embodiment of the present disclosure.
Figure 34B:
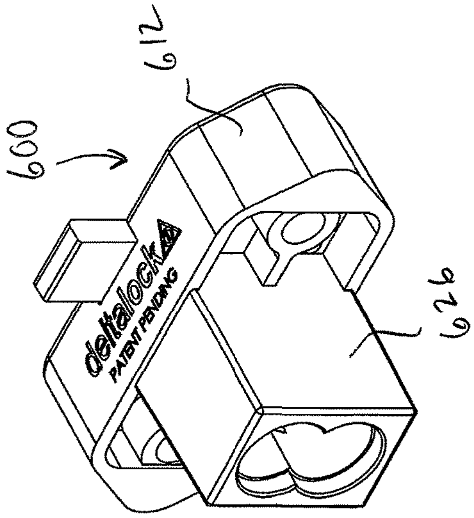
Figure 34C:
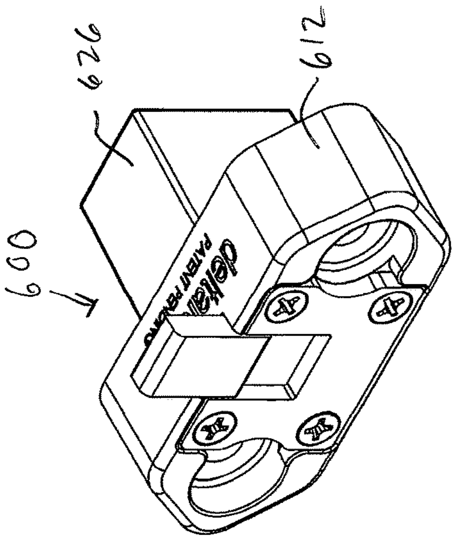
Figure 34D:
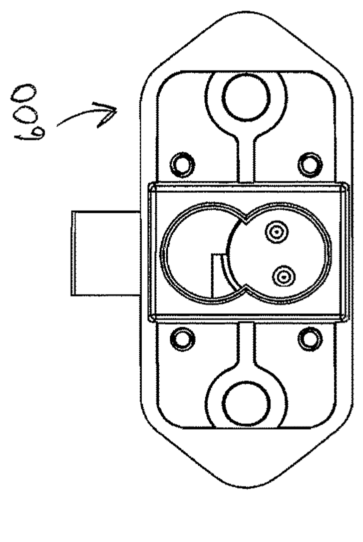
Figure 34E:
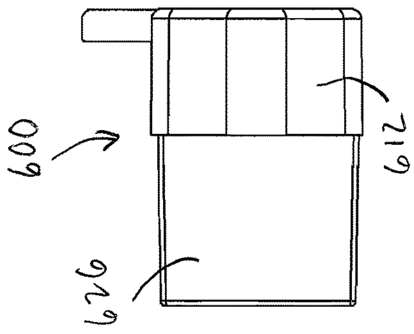
Figure 34F:
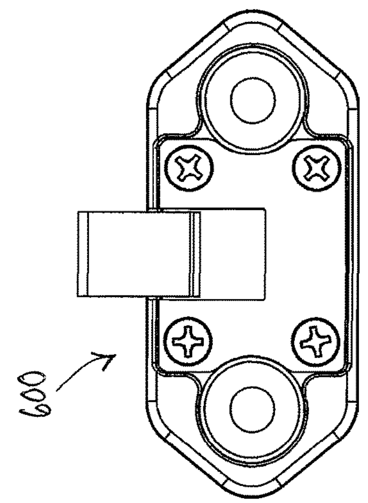

In a yet further example, FIGS. 34A-34F illustrates various views of a seventh embodiment of a locking device 600 with a rectangular barrel 626 and faceted body or housing 612, where FIG. 34A is a top view, FIG. 34B is a front perspective view, FIG. 34C is a rear perspective view, FIG. 34D is a front view, FIG. 34E is a side view and FIG. 34F is a rear view.

Figure 35C:
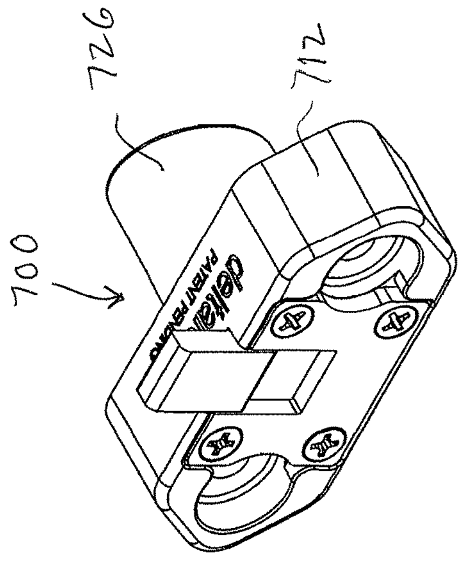
FIGS. 35A-35F illustrate various views of a locking device in accordance with a eighth embodiment of the present disclosure.
Figure 35B:
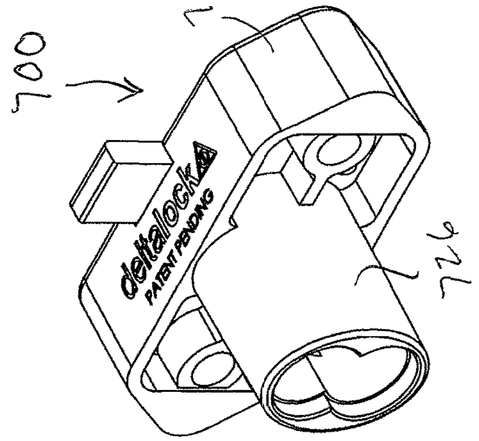
Figure 35A:
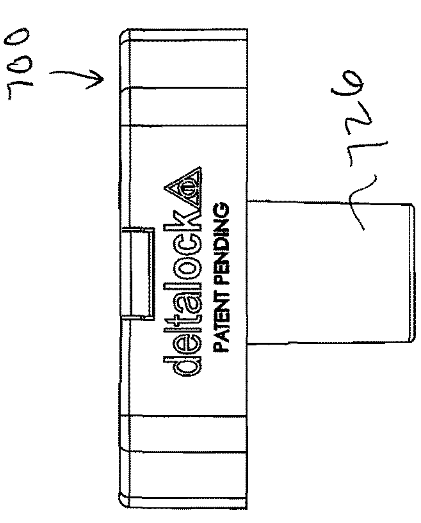
Figure 35F:
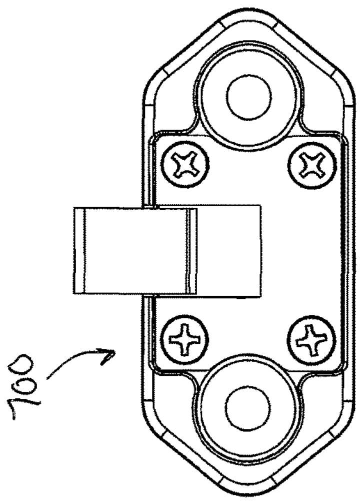
Figure 35E:
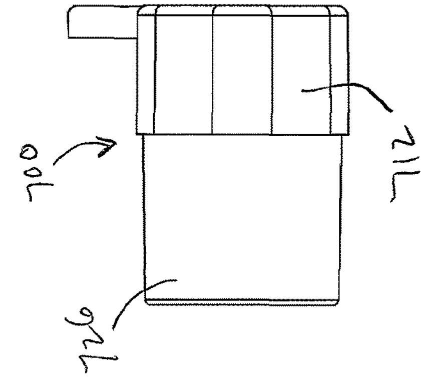
Figure 35D:
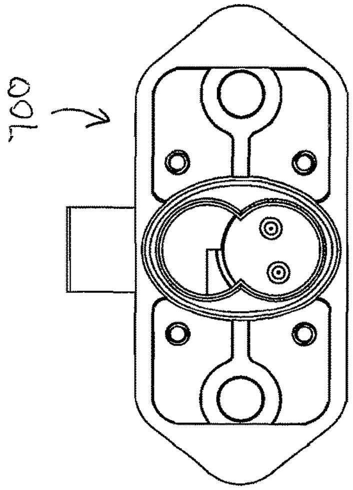

In another example, FIGS. 35A-35F illustrates various views of an eighth embodiment of a locking device 700 with an oval barrel 726 and faceted body or housing 712, where FIG. 35A is a top view, FIG. 35B is a front perspective view, FIG. 35C is a rear perspective view, FIG. 35D is a front view, FIG. 35E is a side view and FIG. 35F is a rear view.

Figure 36C:
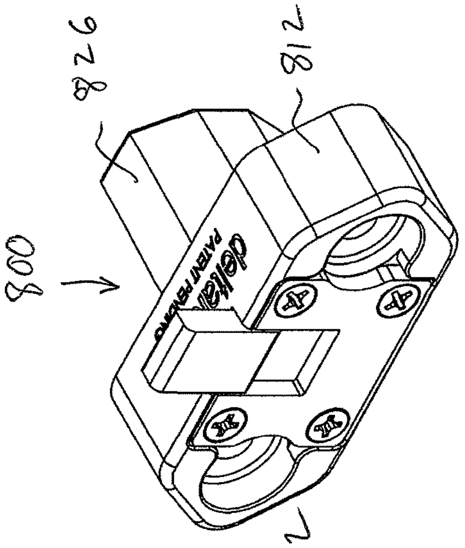
FIGS. 36A-36F illustrate various views of a locking device in accordance with a ninth embodiment of the present disclosure.
Figure 36B:
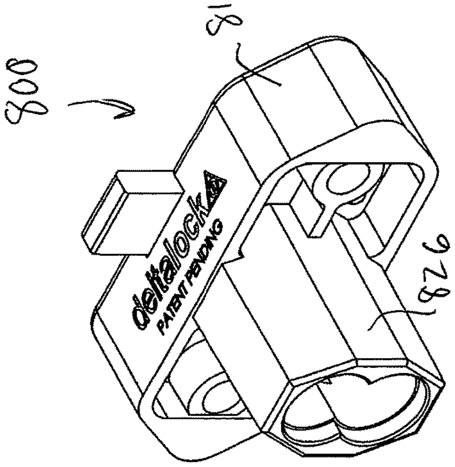
Figure 36A:
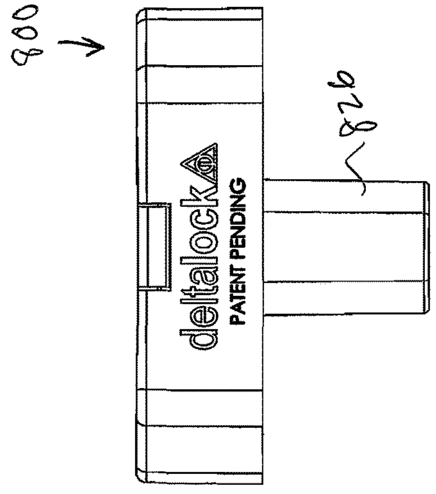
Figure 36F:
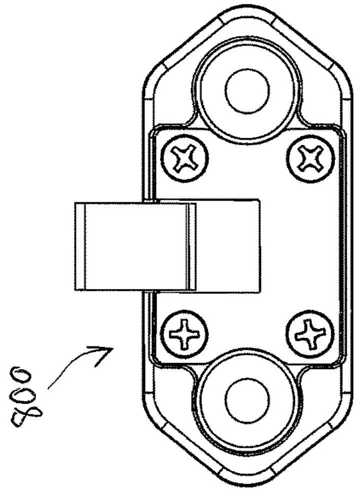
Figure 36E:
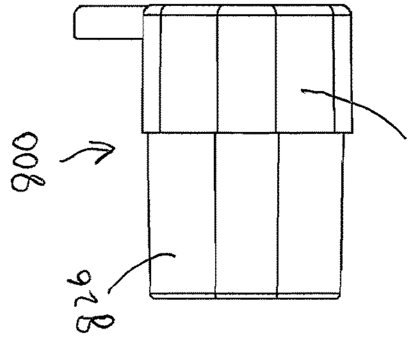
Figure 36D:
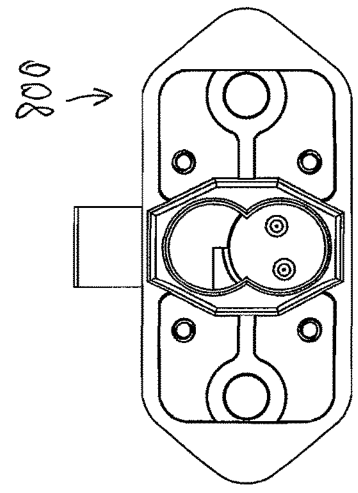

In still another example, FIGS. 36A-36F illustrates various views of a ninth embodiment of a locking device 800 with a faceted barrel 826 and faceted body or housing 812, where FIG. 36A is a top view, FIG. 36B is a front perspective view, FIG. 36C is a rear perspective view, FIG. 36D is a front view, FIG. 36E is a side view and FIG. 36F is a rear view.

Figure 37C:
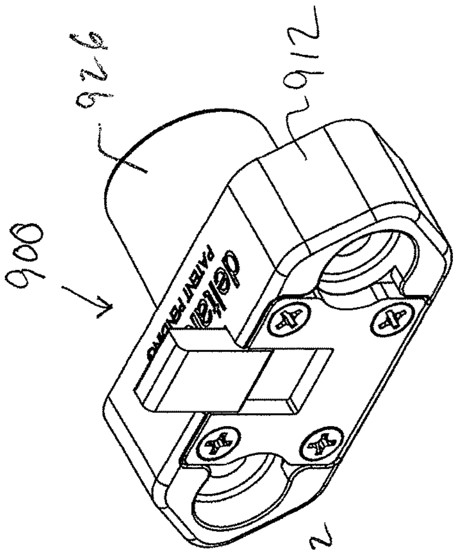
FIGS. 37A-37F illustrate various views of a locking device in accordance with a tenth embodiment of the present disclosure.
Figure 37B:
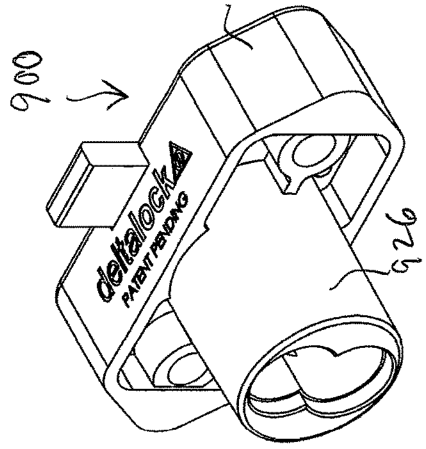
Figure 37A:
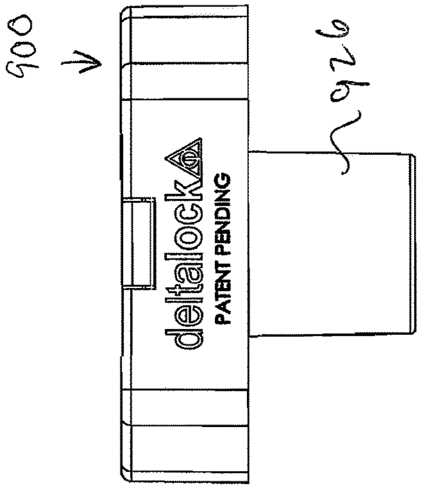
Figure 37F:
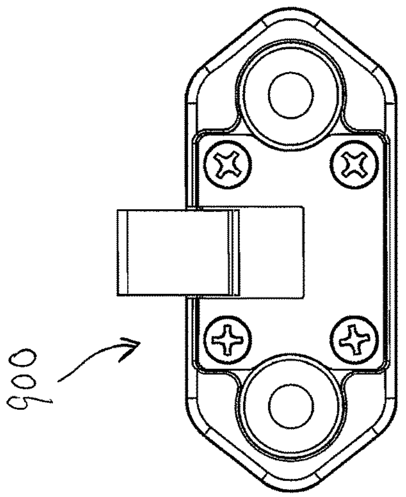
Figure 37E:
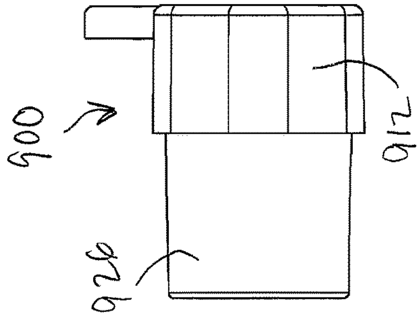
Figure 37D:
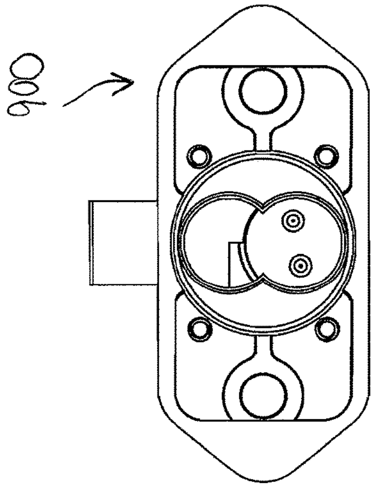

In a further example, FIGS. 37A-37F illustrates various views of a tenth embodiment of a locking device 900 with a round barrel 926 and faceted body or housing 912, where FIG. 37A is a top view, FIG. 37B is a front perspective view, FIG. 37C is a rear perspective view, FIG. 37D is a front view, FIG. 37E is a side view and FIG. 37F is a rear view.

Figure 38A:
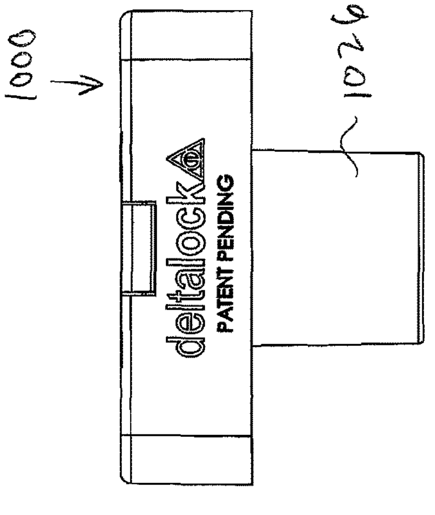
FIGS. 38A-38F illustrate various views of a locking device in accordance with a eleventh embodiment of the present disclosure.
Figure 38B:
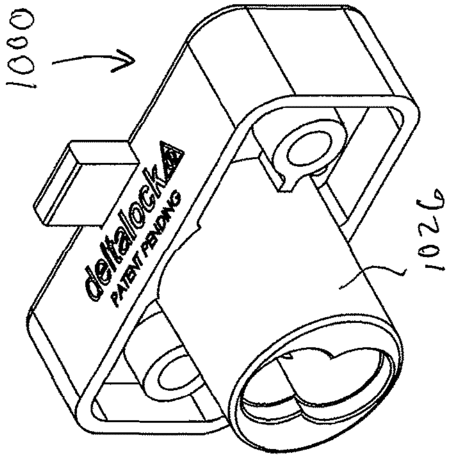
Figure 38C:
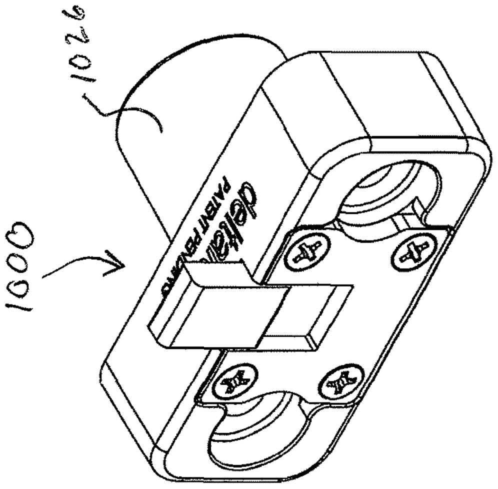
Figure 38D:
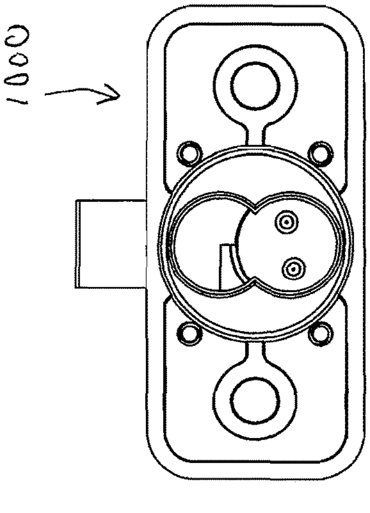
Figure 38E:
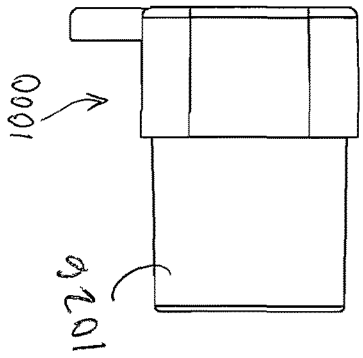
Figure 38F:
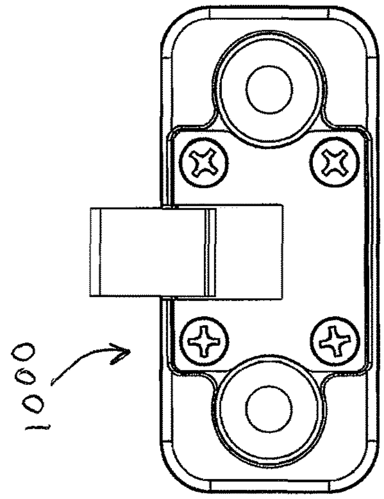

In another example, FIGS. 38A-38F illustrates various views of an eleventh embodiment of a locking device 1000 with a round barrel 1026, where FIG. 38A is a top view, FIG. 38B is a front perspective view, FIG. 38C is a rear perspective view, FIG. 38D is a front view, FIG. 38E is a side view and FIG. 38F is a rear view.

It is to be appreciated that the housing and barrel of the present disclosure may take many forms and shapes and is not to be limited to the embodiments shown herein.

It is to be appreciated that the various features shown and described are interchangeable, that is a feature shown in one embodiment may be incorporated into another embodiment.

While the disclosure has been shown and described with reference to certain preferred embodiments thereof, it will be understood by those skilled in the art that various changes in form and detail may be made therein without departing from the spirit and scope of the disclosure. For example, while a key removable core and SFIC core have been shown and described, it is to be appreciated that the present disclosure contemplates using other various types of locking actuation member such as cores and/or cylinders including, but not limited to, large format interchangeable cores, full size interchangeable cores, a fixed cylinder, etc. It is further to be appreciated that the housings and drivers in accordance with the spirit of the present disclosure may be modified to incorporate future or to-be-invented cores and/or cylinders. In addition to cores and/or cylinders, the present disclosure contemplates that the housings and drivers in accordance with the spirit of the present disclosure may be modified to incorporate future or to-be-invented locking actuation members that function similarly to cores and/or cylinders.

Furthermore, although the foregoing text sets forth a detailed description of numerous embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed is:

1. A drawer lock assembly comprising:

a housing having a front face and a rear face separated by a predetermined width;

a barrel having a first end extending perpendicularly from the front face of the housing and a second end extending to the rear face of the housing;

a locking actuation member disposed through the first end of the barrel;

a driver disposed through the second end of the barrel to engage the locking actuation member;

a bolt including a first member offset from a second member in a parallel relationship, the first member includes a slot configured to receive a cam of the driver; and an endplate configured to retain the driver and bolt in the housing, the endplate including a channel configured to receive the second member of the bolt, wherein upon actuation of the locking actuation member by a key, the second member extends beyond the housing to engage a recess of a structure.

2. The drawer lock assembly of claim 1, wherein the driver includes a first surface and a second surface, the first surface including a slot that is configured to receive a member of locking actuation member, the second surface including cam configured to interact with the bolt to move the bolt into a locked or unlocked position.

3. The drawer lock assembly of claim 2, wherein the locking actuation member is a key removable core.

4. The drawer lock assembly of claim 1, wherein the rear surface of the housing includes a recess configured to enable actuation of the first member of the bolt.

5. The drawer lock assembly of claim 4, further comprising a retention plate that retains the driver in the recess of the housing.

6. The drawer lock assembly of claim 5, wherein the retention plate includes an aperture that receives the cam of the driver and limits the motion of the cam.

7. The drawer lock assembly of claim 1, wherein the housing includes at least two mounting holes extending from an inner surface of the housing and positioned on opposite sides of the barrel, a leg couples each mounting hole barrel to give structural support to the at least two mounting holes.

8. The drawer lock assembly of claim 7, wherein at least two mounting holes are recessed from a rear surface of the housing.

9. The drawer lock assembly of claim 1, wherein the driver includes a circular disc having a first surface and a second surface, the first surface including a first prong and a second prong extending perpendicularly from the first surface and configured to engage the locking actuation member, the second surface including a cam configured to interact with the bolt to move bolt into a locked or unlocked position.

10. The drawer lock assembly of claim 9, wherein the locking actuation member is a small format interchangeable core, the small format interchangeable core having a first end and a second end, the second end including first and second channels configured to receive the first and second prongs of the driver.

11. The drawer lock assembly of claim 10, further comprising a retention plate that retains the driver in the recess of the housing, wherein the retention plate includes a semi-circular aperture that receives the cam of the driver and limits the motion of the cam.

12. The drawer lock assembly of claim 1, wherein the barrel is a cylindrical barrel.

13. The drawer lock assembly of claim 1, wherein the barrel is an oval barrel.

14. The drawer lock assembly of claim 1, wherein the barrel is a faceted barrel.

15. The drawer lock assembly of claim 1, wherein the barrel is a rectangular barrel.

16. The drawer lock assembly of claim 1, wherein the housing is at least one of a rectangular housing and a faceted housing.

17. The drawer lock assembly of claim 1, wherein the locking actuation member is at least one of a small format interchangeable core, a key removable, a large format interchangeable core, a full size interchangeable core and/or a fixed cylinder.

18. The drawer lock assembly of claim 1, wherein the housing is a rectangular housing.

19. The drawer lock assembly of claim 1, wherein the housing is a faceted housing.

* * * * *